(12) United States Patent
Fadden

(10) Patent No.: US 6,545,686 B1
(45) Date of Patent: *Apr. 8, 2003

(54) CACHE MEMORY AND METHOD FOR USE IN GENERATING COMPUTER GRAPHICS TEXTURE

(75) Inventor: Richard Gerry Fadden, Santa Clara, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/241,596

(22) Filed: Feb. 2, 1999

Related U.S. Application Data

(63) Continuation of application No. 08/991,886, filed on Dec. 16, 1997, now Pat. No. 6,002,407.

(51) Int. Cl.⁷ .................................................. G09G 5/00
(52) U.S. Cl. ...................................................... 345/582
(58) Field of Search ................................ 345/425–430, 345/118, 506, 515, 511, 582, 564, 552, 418, 587; 382/232, 233, 285

(56) References Cited

U.S. PATENT DOCUMENTS

| | | | |
|---|---|---|---|
| 3,418,459 A | 12/1968 | Purdy et al. ............. 235/150.2 |
| 3,441,789 A | 4/1969 | Harrison, III ................ 315/18 |
| 3,454,822 A | 7/1969 | Harrison, III ................ 315/22 |
| 3,527,980 A | 9/1970 | Robichaud et al. ............ 315/22 |
| 3,585,628 A | 6/1971 | Warnock .................. 340/324.8 |
| 3,602,702 A | 8/1971 | Warnock ..................... 235/151 |
| 3,621,214 A | 11/1971 | Romney et al. ............. 235/151 |
| 3,665,408 A | 5/1972 | Erdahl et al. ............ 340/172.5 |
| 3,736,564 A | 5/1973 | Watkins .................... 340/172.5 |
| 3,747,087 A | 7/1973 | Harrison, III et al. ....... 340/324 |
| 3,769,442 A | 10/1973 | Heartz et al. ................. 35/10.4 |

(List continued on next page.)

Primary Examiner—Jeffery Brier
Assistant Examiner—Chanté Harrison

(57) ABSTRACT

The present invention uses a novel cache memory allowing a high texture calculation rate while using a low cost single bank DRAM hardware. In accordance with this invention, pixels are processed in a cluster, for example by processing pixels within a region as a cluster of pixels, with the regions of pixels arranged in a fixed gridwork across the area of the display with fixed, unchanging boundaries. All polygon-pixels occurrences within a region are processed together in one operation. Texture processing for all polygon-pixels within a region are broken down in to a set of information gathering operations for all polygon-pixels within the region, followed by a high speed fetching of all needed texels to process the entire region. Following this, high speed interpolation operations are preformed via use a specially arranged on chip RAM and a hardware pipeline calculation.

11 Claims, 7 Drawing Sheets

U.S. PATENT DOCUMENTS

| | | | |
|---|---|---|---|
| 3,786,478 A | 1/1974 | King, Jr. | 340/324 |
| 3,792,463 A | 2/1974 | Eriksson et al. | 340/324 |
| 3,816,726 A | 6/1974 | Sutherland et al. | 235/152 |
| 3,889,107 A | 6/1975 | Sutherland | 235/152 |
| 3,969,716 A | 7/1976 | Roberts | 340/324 |
| 3,996,673 A | 12/1976 | Vorst et al. | 35/10.2 |
| 3,999,308 A | 12/1976 | Peters | 35/12 N |
| 4,017,985 A | 4/1977 | Heartz | 35/10.4 |
| 4,038,668 A | 7/1977 | Quarton | 235/151 |
| 4,053,740 A | 10/1977 | Rosenthal | 364/705 |
| 4,074,281 A | 2/1978 | Quarton | 346/110 R |
| 4,077,062 A | 2/1978 | Nielsen | 364/521 |
| 4,119,954 A | 10/1978 | Seitz et al. | 340/324 |
| 4,119,956 A | 10/1978 | Murray | 340/324 |
| 4,127,850 A | 11/1978 | Vallins | 340/324 |
| 4,129,860 A | 12/1978 | Yonezawa et al. | 340/324 |
| 4,179,823 A | 12/1979 | Sullivan et al. | 35/10.24 |
| 4,179,824 A | 12/1979 | Marsh | 35/10.24 |
| 4,189,743 A | 2/1980 | Schure et al. | 358/93 |
| 4,193,092 A | 3/1980 | Stoffel | 358/136 |
| 4,208,719 A | 6/1980 | Lotz et al. | 364/515 |
| 4,208,810 A | 6/1980 | Rohner et al. | 35/10.24 |
| 4,213,252 A | 7/1980 | Sullivan et al. | 35/10.24 |
| 4,215,414 A | 7/1980 | Huelsman | 364/515 |
| 4,225,861 A | 9/1980 | Langdon, Jr. et al. | 340/703 |
| 4,237,457 A | 12/1980 | Houldsworth | 340/728 |
| 4,262,290 A | 4/1981 | Vallins | 340/728 |
| 4,263,593 A | 4/1981 | Dagostino et al. | 340/728 |
| 4,263,726 A | 4/1981 | Bolton | 434/43 |
| 4,297,691 A | 10/1981 | Kodama et al. | 340/723 |
| 4,324,401 A | 4/1982 | Stubben et al. | 273/85 G |
| 4,343,037 A | 8/1982 | Bolton | 364/521 |
| 4,348,184 A | 9/1982 | Moore | 434/42 |
| 4,352,105 A | 9/1982 | Harney | 343/5 CD |
| 4,360,883 A | 11/1982 | Ejiri et al. | 364/515 |
| 4,384,338 A | 5/1983 | Bennett | 364/522 |
| 4,396,989 A | 8/1983 | Fleming et al. | 364/521 |
| 4,404,553 A | 9/1983 | Cuffia | 340/728 |
| 4,432,009 A | 2/1984 | Reitmeier et al. | 358/22 |
| 4,437,122 A | 3/1984 | Walsh et al. | 358/166 |
| 4,446,529 A | 5/1984 | Strolle | 364/723 |
| 4,454,593 A | 6/1984 | Fleming et al. | 364/900 |
| 4,463,380 A | 7/1984 | Hooks, Jr. | 358/160 |
| 4,471,349 A | 9/1984 | Strolle | 340/727 |
| 4,475,104 A | 10/1984 | Shen | 340/729 |
| 4,484,188 A | 11/1984 | Ott | 340/728 |
| 4,486,785 A | 12/1984 | Lasher et al. | 358/284 |
| 4,489,389 A | 12/1984 | Beckwith et al. | 364/522 |
| 4,498,080 A | 2/1985 | Culver | 340/728 |
| 4,528,642 A | 7/1985 | Waller | 364/900 |
| 4,532,503 A | 7/1985 | Pennebaker | 340/728 |
| 4,543,645 A | 9/1985 | Vigarie | 364/900 |
| 4,544,922 A | 10/1985 | Watanabe et al. | 340/728 |
| 4,549,275 A | 10/1985 | Sukonick | 364/521 |
| 4,570,233 A | 2/1986 | Yan et al. | 364/522 |
| 4,580,782 A | 4/1986 | Ochi | 273/86 R |
| 4,584,572 A | 4/1986 | Lambert, III | 340/703 |
| 4,586,037 A | 4/1986 | Rosener et al. | 340/728 |
| 4,600,919 A | 7/1986 | Stern | 340/725 |
| 4,609,917 A | 9/1986 | Shen | 340/729 |
| 4,610,026 A | 9/1986 | Tabata et al. | 382/47 |
| 4,614,941 A | 9/1986 | Jarvis | 340/747 |
| 4,615,013 A | 9/1986 | Yan et al. | 364/521 |
| 4,645,459 A | 2/1987 | Graf et al. | 434/43 |
| 4,656,467 A | 4/1987 | Strolle | 340/727 |
| 4,677,576 A | 6/1987 | Berlin, Jr. et al. | 364/522 |
| 4,679,040 A | 7/1987 | Yan | 340/747 |
| 4,680,720 A | 7/1987 | Yoshii et al. | 364/521 |
| 4,727,365 A | 2/1988 | Bunker et al. | 340/728 |
| 4,811,245 A | 3/1989 | Bunker et al. | 364/521 |
| 4,825,391 A | 4/1989 | Merz | 364/526 |
| 4,862,388 A * | 8/1989 | Bunker | 345/427 |
| 4,905,164 A | 2/1990 | Chandler et al. | 364/518 |
| 4,918,625 A | 4/1990 | Yan | 364/522 |
| 4,965,745 A | 10/1990 | Economy et al. | 364/518 |
| 4,974,176 A | 11/1990 | Buchner et al. | 364/522 |
| 5,123,085 A | 6/1992 | Wells et al. | 395/121 |
| 5,367,615 A | 11/1994 | Economy et al. | 395/129 |
| 5,764,237 A * | 6/1998 | Kaneko | 345/430 |
| 5,767,858 A * | 6/1998 | Kawase | 345/430 |
| 6,292,194 B1 * | 9/2001 | Powell, III | 345/430 |

\* cited by examiner

Solid Lines: Texture Page Boundaries
Dotted Lines: Texel Boundaries within a Texture Page 510 Texture Page
512 Oct Group (Eight Texels)

CACHE MEMORY AND METHOD FOR USE IN GENERATING COMPUTER GRAPHICS TEXTURE

This continuation application claims priority to application(s) Ser. No(s). 08/991,886; filed Dec. 16, 1997 now U.S. Pat. No. 6,002,407.

TECHNICAL FIELD

This invention pertains to computer graphics, and more particularly to generating pixel results in computer graphics images by sampling texture data.

BACKGROUND

The present invention solves a long-standing problem in low-cost-real-time computer graphics. A critical component of real-time computer graphics involves the use of special purpose hardware to implement fast, efficient texture calculation. The hardware must also control the Texture Memory read process, which includes reading up to 8 input samples to produce one pixel of output. Eight independent memory units may be used to supply the stream of data, but in a low-cost implementation only a single Dynamic RAM (DRAM) memory bank is available. When using only a single bank DRAM, the actual pattern of memory access causes significant delays—due to the numerous read operations, and due to the semi-random pattern of access.

This invention solves the memory access problem via a novel cache memory, and a method for its use, allowing maximum texture calculation rate while using a low-cost single bank DRAM hardware implementation.

Texture Generator Controls Reading Texels from a MIP Map Stored in DRAM

The Texture Generator subsystem calculates the memory addresses needed to control reading pre-stored values from Texture Memory. The Texture Memory contains digitized images of synthesized images consisting of a two-dimensional matrix of sample values (Texels). To support a proper, non-aliased sampling process, each two-dimensional image is stored along with additional representations of the image which contain successively lower resolution versions of the original image. An original image of 256 by 256 samples for example is stored along with a representation of this same image which is digitized with only 128 by 128 samples. This two to one reduction in resolution in each sample axis is fully supported, with versions of the original image extending all the way down to a nearly final 2 Texel by 2 Texel representation, finishing with a single 1×1 representation of the image (a single Texel). This pre-filtering technique (involving re-sampling and storing prior to the real-time texture sampling process) has been named the MIP MAP storage technique.

Two Levels of Texture Detail Sampled and Combined

Producing a single texture sample from a MIP MAP which has been stored in texture memory requires two sets of sampling operations which are then properly combined to produce the single output. Since multiple Levels-Of-Detail are stored in memory (for each source image) one set of sampling operations is performed using one of the Level-Of-Detail representations, and the second set of sampling operations are performed in the next lower Level-Of-Detail. This can also be described as selecting the two pre-filtered representations of the original image which happen to straddle the precise sampling resolution that is desired. For example, between the LOD 4 representation of the image and the LOD 3 representation of the image we may wish to sample at essentially a LOD 3.5 level of pre-filtering. This desired result is achieved by sampling at LOD 4, Sampling at LOD 3, and then averaging the results to give an approximate result which looks appropriate as an approximation of LOD 3.5. To allow the fractional component of desired LOD to vary in this case from 3.0 up to 4.0, the fractional component of desired LOD is used to control a linear interpolation between the LOD 3 and LOD 4 result. All such TriLinear MIP Mapped results are computed by blending between two independent occurrences of a LOD sampling operation.

Three or Four Texels Read to Produce a Sample at One LOD

Each LOD sampling operation must produce a result which gives a consistent, continuous appearance from one sampling operation to the next. The sample point is calculated for neighboring pixels in turn by picking the screen location at the center of a pixel and extending a ray from the eye point, through the center of the pixel, extending into scene space, and striking a polygon which contains the texture image mapped onto its surface—calculating the exact location within a MIP Map level where the ray strikes the two-dimensional image. This precise location is then used to control an interpolation process, interpolating between the discrete samples (the Texels) which surround the precise sampling location. To produce a continuous result from one sample to the next the four Texels within the two-dimensional matrix whose centers are nearest to the sample point—are selected, and these four are used in the two-dimensional interpolation process.

As an option this same process can also be used whereby the nearest three Texel centers are used, with three Texels going into the two-dimensional interpolation process. Both three and four input interpolation is described here, since either is acceptable, and the extra miscellaneous logic needed to implement the three sample approach sometimes is avoided in favor of the more simple four input hardware implementation. For simplicity the four input interpolation approach will be used in the following description.

Polygon-Pixel Color Calculation Including Texture

Rendering a Computer Graphics Image typically involves computing pixel brightness for a single polygon at a time, progressing across the pixels of the display, storing the results in a Frame Buffer. Other hardware components manage the process which identifies the pixels to be processed in turn. The set of pixels fed downstream for processing all lie within the area of the single polygon being processed (in this example Feature sequential rendering approach). More specifically, when the center of the pixel happens to lie within the area of the polygon, the pixel is identified as a valid pixel for the following color calculation process.

Calculating the color of a Polygon-Pixel occurrence includes calculating the smoothly varying inherent color of a polygon which is interpolated from the color of vertices, and calculating the Texture result for the pixel, followed by combining Color and Texture, or simply using the Texture results. The Texture result may be a color or monochrome result, and may optionally include translucency which results from the Texture calculation. The option to combine polygon color and texture or alternatively to simply apply the Texture Color as the final results is a choice specified during modeling of the computer graphics scene.

Texture Use Creates Realistic Graphics

Scenes modeled exclusively using color specified at vertices of polygons, with simple interpolation of color across polygons, but with no Texture, appear unrealistic and unnatural to the human eye. Simple color shading of polygons (absence of Texture) also gives imagery that is hard to interpret while in motion, since ground surfaces tend to include smoothly varying color which fails to give the needed Stimulus Gradient that the human visual system expects. As a result, with simple color shading, a real-time graphics display device fails to give the needed visual queues when simulating real-world scenarios, and the user is left unable to determine one's position simply by references to the graphics display.

Texture is added to a scene by specifying a relationship between a digitized image (or synthesized image) and its placement on a flat polygon, similar to the way wallpaper (with an image on its surface) is applied to a flat wall. The Texture Image must be properly translated, rotated, and scaled, and this is specified during modeling, as the relationship between image and polygon are set during the off-line 3D scene composition steps (3D Database Modeling).

The image that is applied to a polygon during Texturing typically contains recognizable features along with subtle brightness variations which clearly remind the human visual system of certain consistent looking materials such as Grass, or Bricks, or Road surface. These consistent brightness or color variations appear across the surface of a polygon with a correct perspective orientation, and this gives the user all of the Stimulus Gradient needed to navigate realistically through a simulated world.

In addition, scenes modeled with textured polygons take on a Realism that is striking, due to the way in which surfaces imitate real-world surfaces. We expect to see subtle brightness variations on surfaces, caused in the real-world by irregular surfaces, imperfections, or even caused by dirt or normal wear and tear. Scenes computed without Texture in contrast all have a wholly artificial appearance—with objects appearing to be made out of perfect materials with no surface irregularities—a condition that does not occur in the real world. Applying Texture to surfaces in a scene therefore creates a realism that adds dramatically to any simulated world.

Extreme Demand for Texture Calculation

Texturing adds enormously to the effectiveness of real-time graphics and so most or all Polygon-Pixel occurrences generated during the rendering process must be processed through the Texture Calculation, which includes the above mentioned need to access eight semi-random memory locations to produce the single Polygon-Pixel result. To sustain real-time updating of Frame Buffer contents, a Polygon-Pixel completion rate of 30 million completed results per second (or more) may be required. This completion rate demand is dictated by the need to calculate more than ¼ million pixels, with an average Polygon coverage of 4 Polygons covering or touching each Pixel (typical), while completing the full scene at a 30 Frame per Second completion rate. In the absence of a sophisticated Texture Memory access technique, such a device would require 240 million semi-random Texel read operations per second, demanded from a single bank of DRAM. Typical DRAM currently supplies 12 million purely random read operations per second, so the Memory Read demands associated with Texture Generation will severely limit graphics performance in the absence of a dramatic improvement in the Texture Memory access concept. The present invention supplies a potential 20 to 1 improvement in supplying the needed Texels to a Texture Generator, while relying on the existing cost-effective DRAM technology.

Problem with Simple Parallel Texel Storage

FIG. 1A and 1B show the problem associated with reading Texels from off-chip DRAM. FIG. 1A shows the four Texels needed to calculate a proper smooth sample point 110, given four input Texels. An attempt to organize memory storage to include four Texels within a single word of storage can be shown to work for FIG. 1A, but does not help when processing FIG. 1B. FIG. 1B shows the need to read four groupings of four Texels in order to supply the proper inputs to the Texture calculation.

Each square in the FIG. 1A grid represents a texel. The dotted line rectangle is drawn to illustrate the four neighboring texels Top Right ("TR") 111, Bottom Right ("BR") 112, Bottom Left ("BL") 113 and Top Left ("TL") 114 used in the interpolation calculation to generate the texture for the pixel corresponding to sample point 110. In this case storing texels 111–114 in a single word would improve the memory access efficiency for the interpolation calculation of sample point 110. However, such a memory grouping would not solve inefficiencies for the interpolation calculation of sample point 130 illustrated in FIG. 1B. FIG. 1B illustrates a second precisely calculated sample point 130. The texels are labeled to indicate how the texels would be stored in memory, using the memory organization approach of FIG. 1A. Each square group of texels comprising texels labeled TR, BR, BL, and TL would be stored in a memory word. The dotted line rectangle in FIG. 1B shows the four texels 131–134 that would be used in the interpolation calculation for sample point 130. Texels 131–134 are each stored as part of a separate memory word. To retrieve texels 131–134, reading memory a word at a time therefore would involve reading four different memory words. FIGS. 1A and 1B illustrate how a fixed grouping of four neighboring texels, stored together in one word for example, would not supply the desired set of four texels with a single read operation. In some cases, as shown in FIG. 1B, four groups of four texels would be needed from texture memory to supply the proper texels for interpolation.

The problem with reading three or four neighboring texels is that the geometry of the situation forces multiple random reads from graphics memory, not the more desirable single random access, followed by several sequential accesses within the same DRAM page. Thus a simple clustering of four neighboring texels does not eliminate the need for three or four random accesses potentially needed to supply a single modulation calculation.

Any conceivable small grouping of Texels still requires one, two, or possibly four read operations from DRAM to supply the inputs needed for a single LOD calculation. Any large grouping of Texels would fail to fit within a single word of DRAM and would require multiple read operations to fetch a Texel (thereby defeating the purpose of large groupings of Texels). A simple grouping of Texels in external DRAM fails to achieve the ultimate speed goal.

Use of a MIP Map to Solve the Undersampling Problem

The multi-resolution storage inherent in a MIP Map is needed to avoid undersampling during the Texture calculation process. A single Level-Of-Detail image applied in perspective on a Polygon can easily lead to undersampling, since pixel centers that are close together on an output display can impinge upon precise texture sample locations that are far distant in Texture Space. Any consistent signal must be sampled at reasonably close intervals (sampled at better than twice the frequency of the signal). When this reasonably close sampling rule is not followed, then successive samples will fail to convey the information that is available in the signal, and instead the result will be the appearance of noise. Undersampling a signal gives noise.

When applying Texture to surfaces we wish to display an image in perspective, on a polygon. The mistake described here causes noise to be displayed instead of an image. This is a serious undesirable side effect of viewing images in perspective. The noise begins and occurs in such a way that pure noise is first preceded by an odd combination of some signal and some noise which gives undesirable visual artifacts called Moire Patterns, which wholly distract a viewer by moving in unpredictable ways across Textured surfaces during simulated motion. The MIP Map technique, if properly applied solves the noise problem, eliminating pure noise and eliminating the possibility of Moire Patterns appearing in the Texture Generator output.

Noise results because texture samples for neighboring pixels sample the texture image with spacing between samples that is too far apart as compared to the spacing of the Texel grid. The solution includes storing a more coarsely sampled version of the same image and using the more coarse representation when the Texture sample points become too widely spaced. As described above, the typical MIP Map actually contains multiple LOD representations, and the essential step of avoiding undersampling requires a per sample selection of the proper LOD to use for the current pixel. Typically this LOD value calculation is performed for each pixel, giving a precise LOD value (including a fractional component of LOD as described above) which is used to control the MIP Map sampling operation.

Texture Level-Of-Detail Calculation

Above we described how a precise LOD number can be used to control interpolation between two LOD samples. Here we stress that this number must be calculated per pixel (per sample) to account for the way in which the perspective view creates a complex variation in Texture spacing from one pixel to the next. The ideal calculation to determine the proper sampling LOD involves taking the Gradient of the Texture Equations, and evaluating this Gradient equation at each pixel center.

Given the two independent texture axis we would actually take the worst case of the Gradient of the S axis and the Gradient of the T axis. This worst case of two numbers is the single result, the single LOD value used to control the MIP Map sampling process at a pixel.

A practical alternative to evaluating the Gradient of S and T involves taking the difference of S and T as measured across the width and height of one pixel. The gradient of S can be approximated via use of the difference of S, sampled one pixel distant in both the horizontal and vertical directions. In practice the Square Root of the Sum of the Squares of these differences is used as the approximation to the Gradient of S at a point. The same approximation is applied to the independent sampling of T at these same locations, and then the worst case of approximated gradients is used to select the LOD for processing a single pixel. This differencing and approximation is repeated for each Polygon-Pixel and used to control sampling the MIP Map. One such LOD value is calculated and used for each Polygon-Pixel sample operation.

DETAILED DESCRIPTION

Texture Stash

Figure 1A:
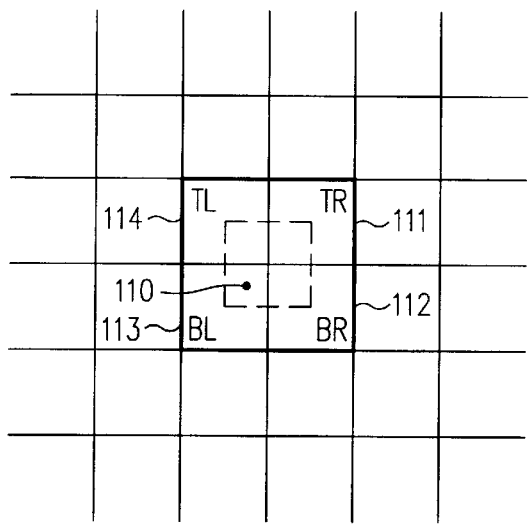
FIG. 1A illustrates a precisely calculated sample point 110 and a group of neighboring texels.
Figure 1B:
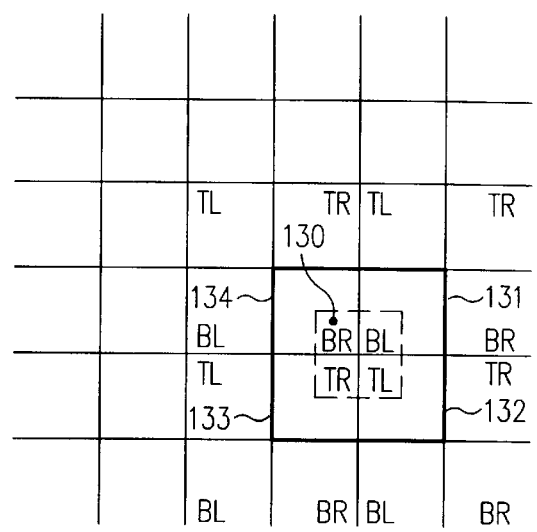
FIG. 1B illustrates a shifted second precisely calculated sample point 130 and a second group of neighboring texels.

The Texture Stash of the present invention and the method of its use solves the problem demonstrated in FIG. 1*b* with a powerful new idea that is ideally suited for the practical single bank DRAM hardware implementation. First, pixels are processed in a cluster. To make the idea work, for example an 8 pixel wide by 8 pixel high Region is used as a unit of processing. These Regions of pixels are arranged in a fixed gridwork across the area of the Display. Here the emphasis is on Regions of pixels with fixed, unchanging boundaries.

Then instead of processing Polygon-Pixels, each as an independent unit of work, all Polygon-Pixel occurrences within a Region are processed together in one larger operation. Texture processing for all Polygon-Pixels within a Region are broken down into a set of Information Gathering operations for all Polygon-Pixels within the Region, followed by an ultimate efficiency Fetching of all needed Texels to process the entire Region. Following this are the full speed interpolation operations, which may progress at a Polygon-Pixel of output being completed at each clock tick via use of a specially arranged on-chip RAM and via a hardware pipeline calculation. The specially arranged on-chip RAM is referred to as the Texture Stash.

Area Coherence Concept

The processing of all neighboring pixels within a Region with whole Region steps as described above allows an optimal sharing of fetched Texels over the largest practical area, while using a highly practical technique which uses very little on-chip RAM for storing fetched Texels. The invention uses a minimal amount of on-chip hardware resources in a near ideal fashion by taking advantage of highly specialized information that is true only for a very special Constrained variant of the Texture Calculation. When this constraint is asserted on the normal Texture Calculation, then and only then is it possible to fetch large areas of Texels whose information is ideally shared among neighboring pixel calculations within a Region.

When this sharing of a large area Fetch is made possible (simply due to the assumption of a Constraint) then any and all Texels fetched for the processing of one pixel are made available and used in the processing of any other pixel within the Region. Essentially an information gathering phase of processing identifies all Texels needed to satisfy the demands of all pixels within the Region, then the full set of needed Texels are fetched and processing continues on the next phase. The final phase proceeds in a simple fashion, knowing all needed Texels have been fetched prior to the start of this phase.

A special on-chip RAM, the Texture Stash, stores fetched Texels, and it is organized to appear as four independent memory banks (on chip) which can feed Texels to the final interpolation phase at the ideal speed of four Texels per clock. In addition, the design of the independent banks solves the problem shown in FIG. 1, since that problem only occurs when attempting to pack multiple Texels into a single memory bank.

In summary, all processing proceeds in Polygon-Region units of operation, with hardware operations (calculate or fetch) divided among three Phases of processing: 1) Information Gathering, 2) Perfect Texel Fetch from DRAM 3) Ideal full speed Interpolation, reading from the unique on-chip Texture Stash.

Special Texture Calculation Constraint

The special Texture calculation constraint of this invention gives a breakthrough increase in sharing fetched Texels within a Region of pixels. Use of the constraint gives dramatically better performance and it drastically simplifies the hardware implementation. The constraint is the assumption that Texture LOD is a constant across the entire area of a Region.

The differencing technique is used across the full width and height of a Region, and the resulting LOD value calculated as described above is assumed to be valid for the entire area of the Region. This assumption allows perfect sharing of fetched Texels within a Region. This also allows the following two hardware reduction and simplification ideas to be used: 1) All fetched Texels that need to be stored in the Texture Stash are from a single LOD of the MIP Map. 2) All Polygon-Pixels within a Region are processed at one Texture LOD, and a following reuse of these hardware units accomplishes processing the second Texture LOD.

Using the hardware to complete one LOD for all Polygon-Pixels within a Region, followed by a completely independent use of this same hardware to process the second LOD gives a very efficient hardware implementation. The Texture Stash therefore only needs to store Texels for a single Texture LOD, and the number of memory locations needed is limited by a further special observation that is detailed in the following section. This special size limiting factor, and the single LOD at a time assumption give a very compact on-chip hardware implementation for the Texture Stash.

Special Size Limiting Factor

Prior to fetching Texels, a Texture LOD value is calculated for use across the entire area of a Region. This Texture LOD calculation serves to avoid undersampling of the digitized image, as described above. Since the possibility of undersampling is eliminated (due to the calculation used) this guarantees that the spacing of per-pixel samples within the area of the Region will not spread over an area greater than one Texel width between each sample. This observation leads to the special size limiting factor: Texel fetches needed for processing an entire Region of Polygon-Pixels are guaranteed to lie within a small contiguous area within Texture Space.

Given the way that the Texture LOD calculation prevents pixel to pixel sample distance from becoming more distant than the width of one Texel in Texture Space, we can calculate the maximum width and height of a square which is placed around the furthest extent of affected Texels. If Region size for example is 8 by 8 pixels (square), then the maximum box dimensions in Texture Space will be the Square Root of 2, times 8, which is simply due to the way in which the projection of Region corners into Texture Space can happen to appear rotated when viewed in Texture Space. FIG. 1E shows the corners of a Region projected into Texture Space (the solid lines at odd angels show the sides of the Region in Texture Space). The dotted-line box surrounding this shape shows the concept of maximum projected size being limited to a certain sized box. In calculating this maximum size box, the Square Root of 2 factor simply accounts for the worst case rotation that would be seen, which is a rotation of 45 degrees. This Square Root of 2 times 8=11.31 distance is simply the distance along the Diagonal of the Region.

Figure 1C:
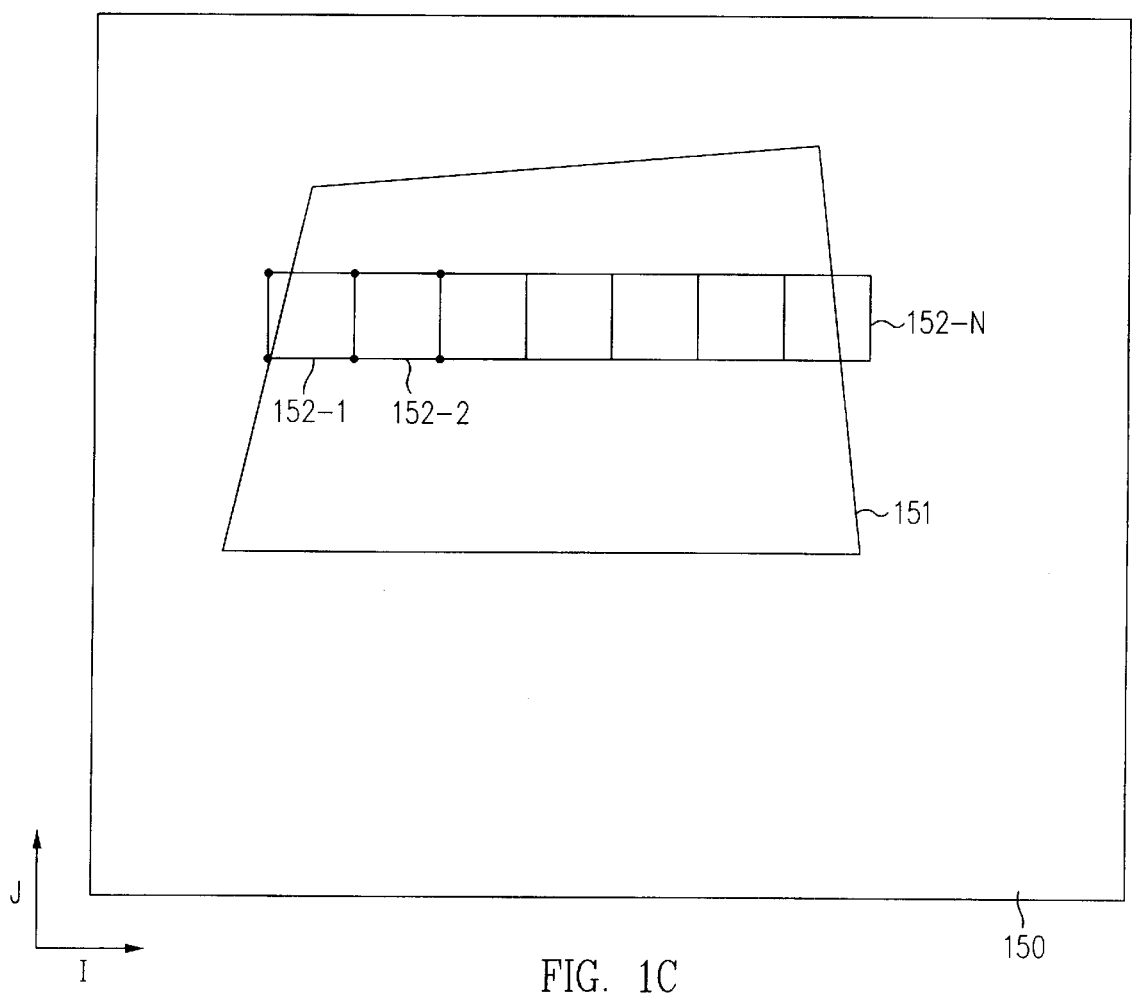
FIG. 1C illustrates a display area 150 and a polygon 151 contained within display area 150.
Figure 1D:
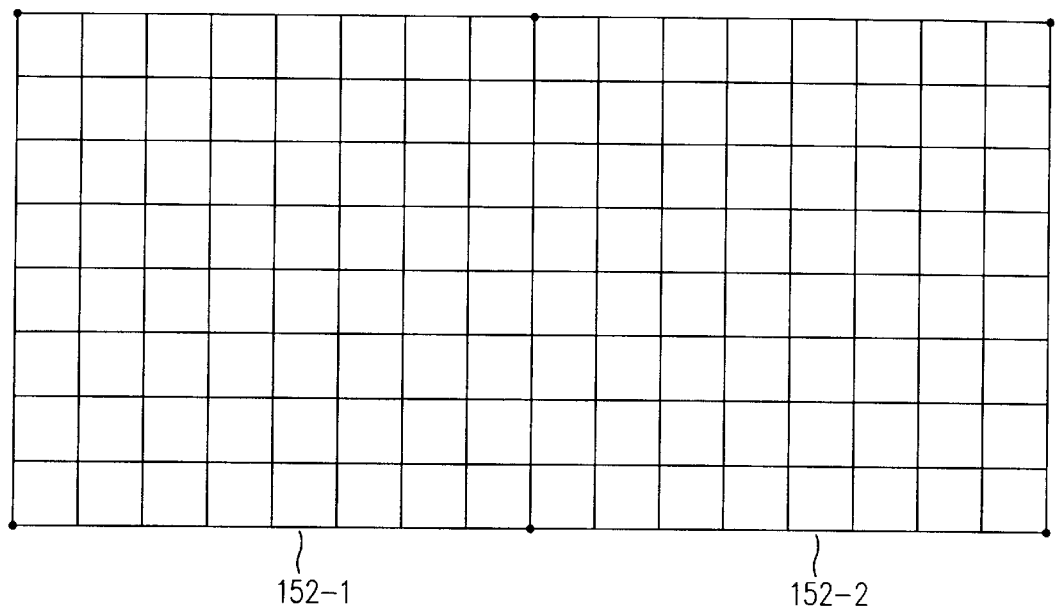
FIG. 1D illustrates a magnified view of spans 152-1 and 152-2, illustrated in FIG. 1C.
Figure 1E:
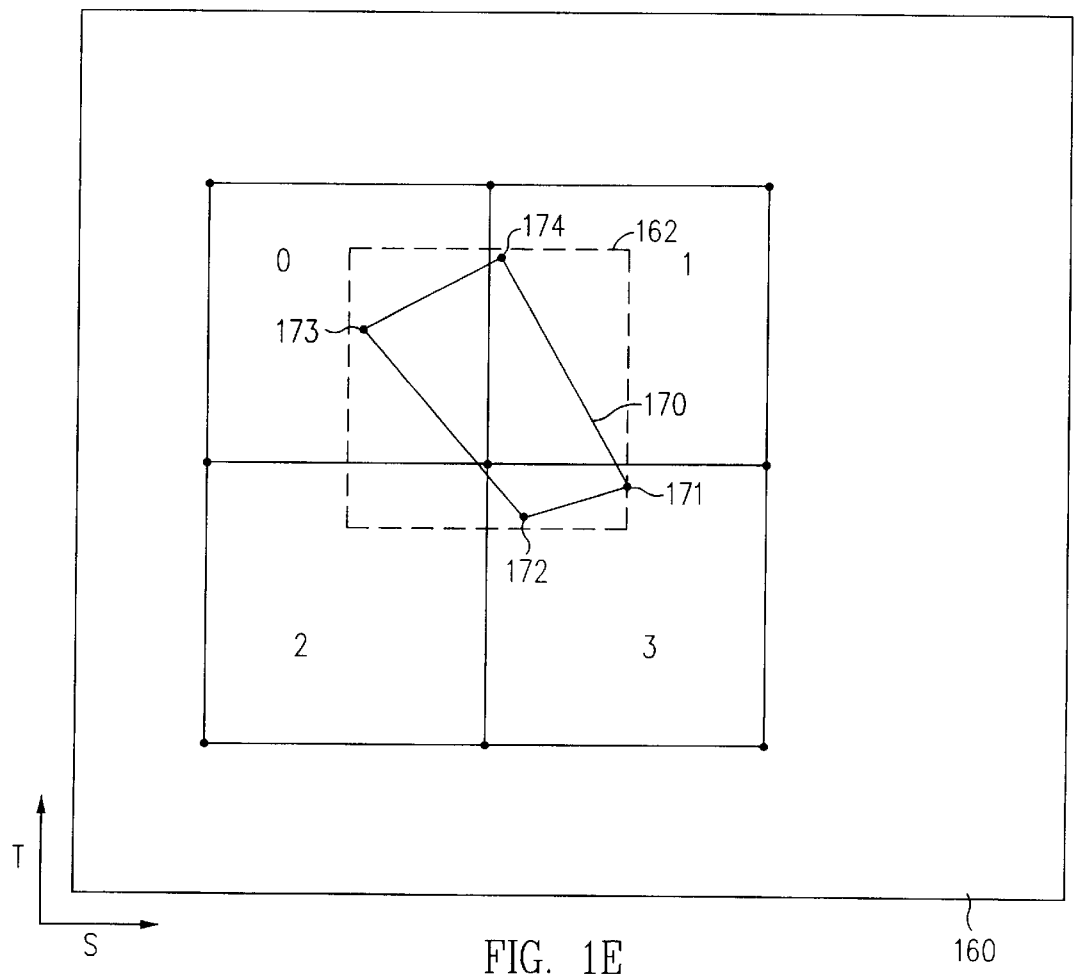
FIG. 1E illustrates the square shaped texture space unit used in one embodiment of the present invention.

In one embodiment of this invention, a single constant texture level-of-detail is forced upon a fixed rectangular grid of pixels in the display, as illustrated in FIG. 1C. In image space the J coordinate defines the position of a point along a vertical axis, and the I coordinate defines the position of a point along a horizontal axis. FIG. 1C illustrates a display area 150 and a polygon 151 contained within display area 150. Polygon 151 is of an irregular shape depicting an object to be displayed within display area 150. Polygon 151 includes a number of pixels, which are conveniently processed as a plurality of rectangular groups of pixels of a fixed orientation with respect to the display, each referred to as a "region" or a "span." Spans 152-1, 152-2 through 152-N illustrate one of the sets of spans that form part of the area 150. Similar spans are used to process the remainder of polygon 151, although for convenience they are not shown in FIG. 1C. Typically, a span will comprise an array of pixels. FIG. 1D illustrates a magnified view of spans 152-1 and 152-2 of FIG. 1C. In this embodiment each span comprises an eight by eight pixel array. Part of the image information associated with each pixel is depth information, as shown for example at the corners of each span.

Contrary to the teachings of the prior art, in accordance with the present invention, the differences in LOD across the width and height of a span (an 8×8 region of pixels) are used to generate a single number which represents which texture LOD to use, and it is applied uniformly across the full area of the span. There are 64 pixels within the span, so all 64 of those pixel are processed using the one texture LOD value. The fact that all 64 pixels can be processed with one texture LOD value to produce quality images is counterintuitive. Span size is selected to be small enough so that the difference between the single level-of-detail approximation and the actual variation in depth is small enough that there are no visible artifacts in the final scene. To maximize the texture generation process efficiency the span size should be set as large as possible without introducing visible artifacts.

Span size is set large enough so that the span corner calculations which require the full floating point divide operations are amortized over a large number of simply interpolated pixels. These are like two different time frames—a per span calculation occurs at a certain rate, and a per pixel calculation occurs much more frequently. The per pixel calculations are set up to average about two clocks per pixel, and the per span calculations may take, for example, 34 clocks per span using a single math unit with program steps to accomplish all span corner or whole span related calculations.

If the number of pixels in the span is reduced, then the span corner calculation speed would need to be increased to achieve a balance in timing between these two factors. This would increase the amount of hardware devoted to this function, and would perhaps require the size of these hardware units to be doubled.

Smaller span size would also reduce the efficiency of the texture stash. At borders between the spans there is a break in the "area coherence" effect which causes some re-fetching of octs due to no "knowledge" being carried across from one span to the next. For example, if oct 23 is fetched to complete a rightmost pixel of a span and the system does not know that oct 23 may likely be requested for a left most pixel of the next span processed in turn. Since there are many face/spans to be processed within each span—some sort of "large area cache" could be used to account for a large number of independent surfaces, however the additional cost may not justify the gain in efficiency.

On the other hand, smaller span size reduces the extent of the negative effects of the constant LOD per span assumption. For those rare cases where the compromise associated with this approach begins to become visible, cutting span size to one-half in each direction gives a significant improvement. In a preferred embodiment, the 8×8 span size is set to the largest acceptable value for the constant LOD per span assumption.

Texture Page Organization

Knowing that a box of dimensions 11.31 along each side will always manage to fit around the area of Texels needed for an (8 by 8) Region enables the use of a special Maximum DRAM FETCH SPEED concept. The 11.31 dimension is rounded up to the nearest higher Power of Two—16 in this case—and Texel storage in DRAM is organized into two-dimensional 16 by 16 sized Texture Page parcels. All levels of a MIP Map are then stored in DRAM using this Texture Page storage concept. Essentially as Texels are to be accessed from DRAM the MIP Map Level is known, and the Texture Page number within a MIP Map level is known.

This known Texture Page relationship is then used to accomplish two important goals in the hardware implementation: 1) A Texture Page is guaranteed to fit within a DRAM page—many Texture Pages may fit within a DRAM Page, but a whole number of Texture Pages are guaranteed to fit, thereby eliminating the possibility of a Texture Page spanning across the boundary of a DRAM Page. 2) No more than Four Texture Pages will be accessed during the fetching of Texels needed to process a Region.

Due to this rule of no more than four, the hardware implementation is cast to take advantage of this upper limit. For example, four registers are used in a special way, and the four registers appear in hardware, with the noteworthy item being the knowledge that no more than four registers are needed for any such hardware implementation.

Figure 2:
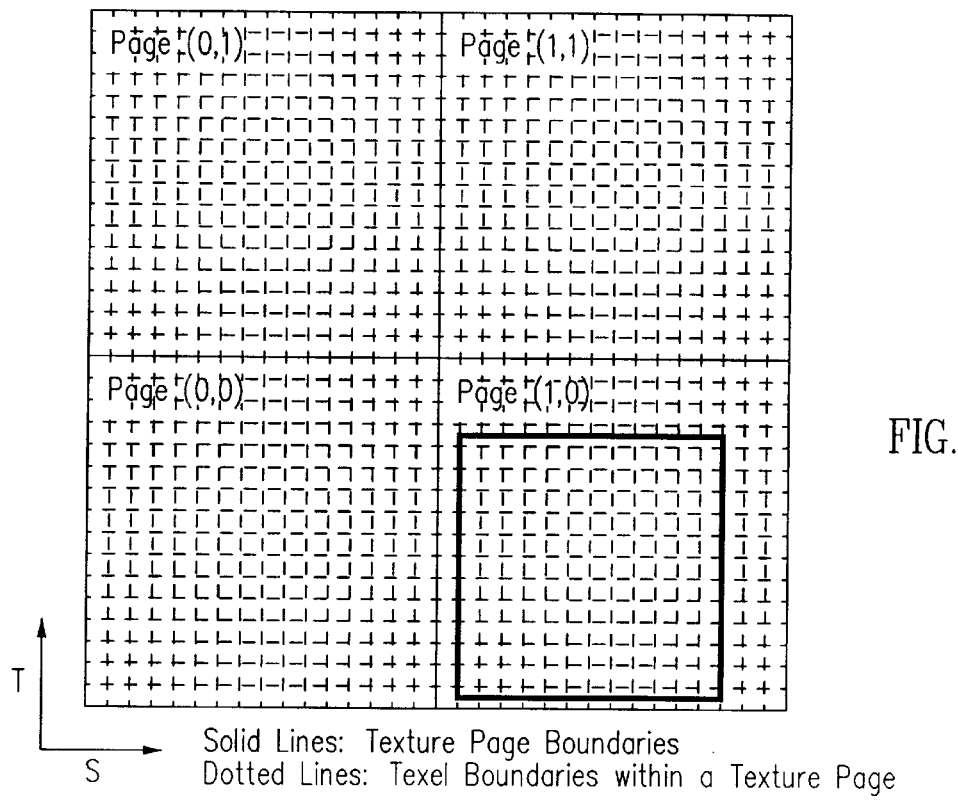
FIG. 2 illustrates a surrounding square contained within a single texture page.
Figure 3:
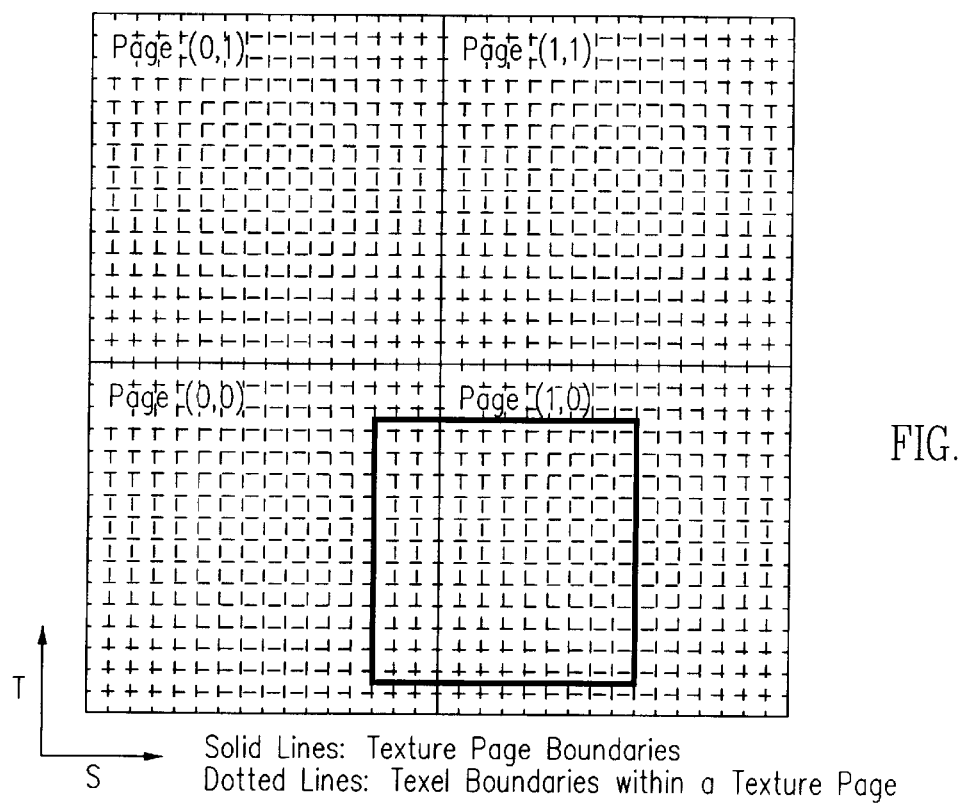
FIG. 3 illustrates a surrounding square that impinges upon two texture pages.
Figure 4:
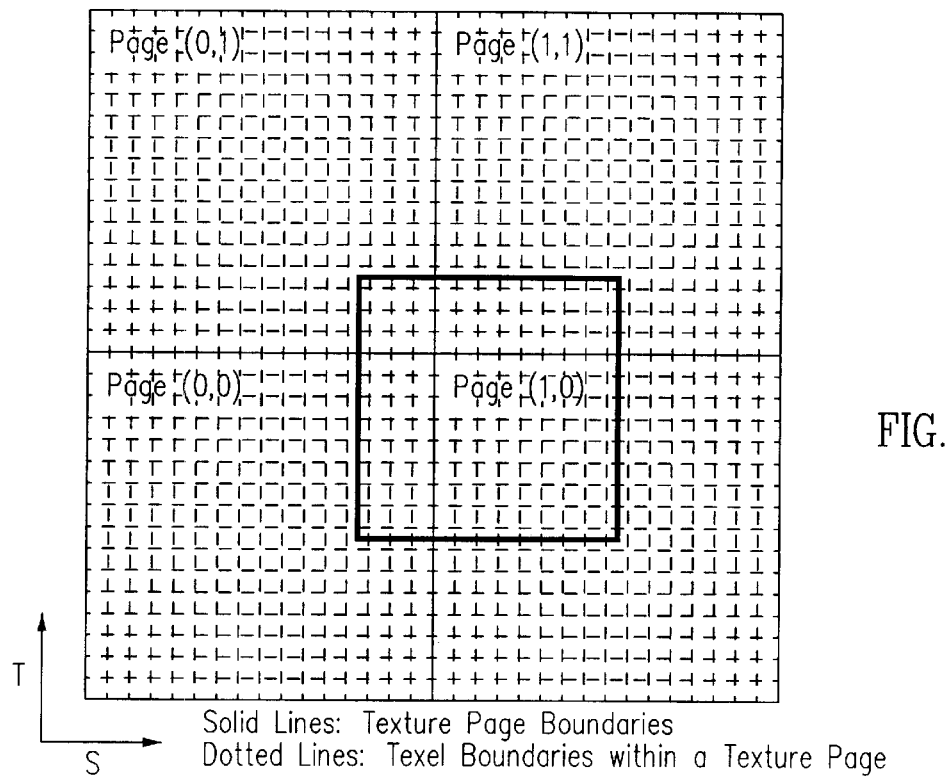
FIG. 4 illustrates a surrounding square that impinges upon four texture pages.

Four Texture Pages can be touched by the area of Texels that is no larger than a Texture Page—since the area of Texels needed may happen to overlap the boundary between the fixed sized regions of Texels stored in DRAM. Essentially a roving window no larger than a Texture Page can happen to impinge upon one, two or four Texture Pages as the window happens to move around the fixed gridwork of Texture Pages. FIGS. 2, 3, and 4 show this effect. The key to minimal hardware implementation is the knowledge that no more than four Texture Pages can be touched during the processing of a Region (only a single Texture LOD is processed at a time).

Texel Demand Grouped into Four Slots

During the Information Gathering phase of Polygon-Region Texture processing the hardware records all needed Texels using a mechanism which can be described as placing the information into four slots, which thereby separates the information into four groups. The four slots correspond to the four Texture Pages, maximum, which can be impinged upon by the Texel demand of a single Region. Information Gathering hardware therefore is implemented using four registers which record which Texels out of the four possible Texture Pages are needed for processing the Region.

The key idea is that following the Information Gathering phase the hardware will be able to read all Texels that are needed for a given Texture Page—with all read operations occurring together. This is done knowing that all of these read operations are guaranteed to lie within a single DRAM page, and so all of these read operations can be performed using the Fast Page Mode Access—whereby successive memory locations are read one per clock with the explicit knowledge that all lie within the same DRAM page.

Since four slots are managed, the hardware also knows how may Texture Page read operations are needed, one, two, or four, and it controls this reading of Texels, knowing that the slow DRAM page change operation can only occur at most, four times. The sequence of memory control operations therefore appear as 1) Read from new DRAM Page, 2) Fast read from the same DRAM Page 3) Fast read 4) Fast read, etc. The change to a new DRAM page, and the fast reading within a DRAM page is perfectly optimized for all Texels fetched for a Polygon-Region.

Two LOD Processed using Two Passes

This perfect optimization of DRAM use is repeated to accomplish the second Level-Of-Detail needed for the Polygon-Region. Also key to this optimum reading from DRAM is the knowledge that the second Level-Of-Detail will be processed with a completely separate pass through this process. The ideal reuse of Texels results from the fact that the full set of pixels within the Region all demand the same Texture LOD from the MIP Map. Two such LOD are demanded to complete the Polygon-Region, but most importantly, each and every pixel demands the same two LOD—so the two LOD are processed as two independent passes which reuse one hardware subsystem. In addition, a Region-sized interpolation result buffer is required to hold the results of the first LOD calculations, such that during the second LOD calculation phase the two results can be combined and output.

Minimizing Number of Reads within a Texture Page

Texels are packed into memory words within the Texture Page groupings using a concept which minimizes the number of Read operations required for fetching needed Texels. Eight Texels are packed into each 64 bit DRAM word (8 bits per Texel) and these units of Texels, called Oct Groups, or Octs give an additional level of efficiency in the implementation.

The eight Texels packed into a single word are a four Texel wide by two Texel high region of neighboring Texels. This nearly square arrangement of Texels within a word serves to take maximum advantage of the Area Coherence which is inherent in Polygon-Region processing. If one Texel is needed, then a read operation must be performed. If eight neighboring Texel values are returned from memory during this one operation, then the other neighbor Texels will on average tend to be ones needed for the processing of other pixels within the Region.

Since the information Gathering phase records all needed Texels, this simply means that many of the needed Texels are fetched using a single read operation. The nearly square packing of eight Texels fetched with one read operation does the best possible job of minimizing the total number of Read operations needed to move Texels from DRAM into the on-chip Texture Stash.

Generating Texel Demand from Precise Coordinate Inputs

As each precise sample point coordinate (precise S and T) come into the Information Gathering Phase, the four neighboring Texels addresses that are needed for the interpolation are generated in parallel. The operation is a truncation to produce the bottom-left Texel address (the Texel of the four which has the smallest S and T coordinate) and the other three Texel addresses are produced by adding 1 to either the S or T component, incrementing up by one from the bottom-left Texel.

The key component of this step is a detection of any occurrence of the neighboring Texels potentially straddling the boundaries of a Texture Page. This can happen in the S or T directions, so the four Texels may happen to lie within a single Texture Page, or happen to lie within two or four Texture Pages. The hardware produces four Texel addresses, and it detects the number of unique Texture Pages referenced by these four Texels. These one to four outputs are staged in sequence into the next hardware component which is described below (the Detect Unique Texture Page unit).

Detecting Unique Texture Pages On-The-Fly

A set of four parallel comparators are used to detect the unique Texture Pages to use for the current Polygon-Region, accomplishing this on-the-fly within the Information Gathering phase of processing. Four registers are used, one register per comparator, and initially the registers are cleared prior to this phase of processing. Then as each Texture Page number from the upstream hardware is received, it is compared, in parallel with the four register values. Initially cleared, the register compares will determine that the first Texture Page value does not appear in any of the four registers, so this Page number is therefore detected as a unique new Texture Page number. In this case the Texture Page number is stored in one of the four available registers.

This parallel compare operation serves to detect the four possible Texture Page numbers that can appear in the stream of Texels to be fetched. This quad parallel compare operation also serves to identify the slot number (1 through 4) where the Texel Address is to be stored.

All input Texels for the Polygon-Region are therefore detected and broken up into up to four slots, corresponding to the four possible Texture Pages touched by the Region. When all Information Gathering is complete, up to four Texture Page numbers will be available, along with information about the Texels touched within each Texture Page.

Generating and Combining Oct Touched Masks

As the unique Texture Page numbers are detected and one of four storage slots is identified for storage, the actual Oct Group which contains the Texel is marked as needed in a special mask word. For example a mask of 32 bits indicates which Octs are demanded within a single Texture Page. Each Oct contains eight Texels, so this accounts for all Texels that may be needed within a Texture Page. By setting a bit within the 32 bit word which indicates the Oct Group for the current Texel, a bitwise OR operation may be performed with a Register which keeps track of all needed Octs for the Texture Page.

This operation accounts for the fact that successive Texels may happen to mark the same Oct Group. The hardware proceeds with the bitwise OR operations, and when all such marking operations are complete the register contains a bit mask indicating which Octs must be read from DRAM.

Since Texels may be categorized into one of four slots, based upon detecting unique Texture Page numbers, four separate 32 bit Registers keep track of the demands of up to four Texture Pages of Oct Groups.

The present invention takes advantage of area coherence by delaying read operations until after all requests within a texture page are known. For example, two independent texel read operations might ordinarily cause the demand reading of an oct of texels, and in the absence of any sophistication this could cause a wasted re-reading of the same word from memory. The hardware instead records which octs are needed for a given texture page, it then requests all octs together in one combined set of fetch operations, and then following this the texel values are used to perform the various smoothing calculations which use four texels at a time to produce an output.

As the set of actual sample addresses flow into the hardware subsystem, a tally is maintained as to which oct groups are "touched" by these sample points. As a further detail, processing each sample requires use of four neighboring texels. These four texels may happen to lie within one oct group, or the four may cross an oct group boundary, impinging upon two oct groups, and in a worst case these four texels can happen to impinge upon four different oct groups. Given this, then for each incoming sample, one, two, or four oct groups may be marked as touched.

A touched oct group must be read from graphics memory, such that at a later time the various texel values are all in chip memory to then facilitate the full speed completion of the texture calculation.

For any of the cases where two or four octs are touched, these octs may lie within one texture page, or within two or possibly four texture pages. On average the one, two or four octs will tend to lie within one texture page. Less likely, two texture pages are affected, and even more rare is the four texture page case. The system of the present invention detects the number of octs needed to supply the four texels for a sample and then marks the affected octs one at a time. In one embodiment, one oct per clock cycle is marked.

The hardware maintains up to four texture pages worth of octs, represented as a single bit of storage in a register, per oct. The process of detecting the total set of octs needed to process a single face/span is accommodated with this one bit per allowable oct set of four registers. One register per texture page is used, and up to four texture pages may be used.

Detailed Sample S, T Located Stored

For each precise sample location processed through the Information Gathering phase, the detailed S, T location of the sample is saved in a memory, for use during the third phase of processing, the final interpolation phase. In summary, the precise information comes into the Information Gathering phase in order to determine the exact Texels that need to be fetched. This information is stored within the four words of Mask bits which indicate the Oct Groups which need to be read from DRAM. The information needed to complete the interpolation is saved, as described here, and when the first phase is complete, the second phase can begin.

For the second phase, all Octs that have been marked are read from DRAM using the Texture Page at a time operation described above (which minimizes DRAM Page change operations). The Octs which return from DRAM are stored in the Texture Stash, and when all words have been read, the second phase is complete.

The third phase uses the Texture Stash which contains all needed Texels, and it reads the stored precise S, T information from the on-chip memory, and it initiates one full interpolation operation per clock, cycling through all S, T entries in the local RAM. The RAM contains enough storage to control up to 64 interpolation operations for the Polygon-Region, since the example Region for this description is (8 by 8) pixels.

Find First Bit Detector

When the 32 bit mask of touched Octs is used to control reading words from DRAM, a Find First Bit detector is used with successive operations to detect, process, and clear each bit within the word, using the minimal number of clock cycles. A new Oct to read from DRAM is processed each clock cycle.

Ping-Pong Memories and Pipelined Operation

As is typical for high performance hardware implementations, all three phases of the above described Texture Stash operation can occur in parallel. Ping-Pong memory design is used for each of the memories described, including the Texture Stash. The Information Gathering Phase is operating on a new Polygon-Region (or the second Texture LOD pass of a Polygon-Region) while the Texel Fetch Phase is being performed on the Region previously completed by the Information Gathering Phase. Similarly the final Interpolation Phase is processing concurrently the Texels that have been fetched from DRAM (by the second phase during the previous stage of processing).

Information therefore flows through the three successive pipeline stages, and the transfer of information occurs once all three hardware units have completed the workload for a single Polygon-Region (each phase working on a different problem, sequenced in time).

Other faster implementations are possible, where additional buffering is added to this basic Ping-Pong buffering scheme. Triple-Buffered FIFOs can be designed between these three phases to help improve overall calculation rate. Some Polygon-Regions contain more pixels to be processed, so as a larger area Polygon-Region is input to Information Gathering this does not need to delay the start of phase three processing if the second and third phase are completing a smaller area Polygon-Region. Full Region at a time FIFO operation can be supported between the three hardware phases, with N Region Buffers, where N can be larger than 3. Ping-Pong buffering between phases is the minimum that makes sense, Triple-Buffering is better, and N larger than three produces diminishing gains for a linear increase in gates.

In summary this invention uses N Polygon-Region buffering between pipeline stages, where N can be as low as 2 to produce overlapped, highly efficient Texture Generation using a single bank of DRAM to supply all Texel data.

Face/Span at a Time Pipeline Processing

The texture stash of the present invention uses face/spans as the "spans" or groups of work packets that drive the various stages of processing. For example, since all samples must first pass through the process of marking the needed octs, prior to a batch fetching of octs, the present invention marks all touched octs for a face/span worth of samples prior to moving on to the fetching process. At such a performance critical spot in the calculation pipeline operations such as marking and then the following operation such as fetching should be performed in parallel to accomplish high overall throughput. Therefore one unit of hardware performs the fetching for face/span N, while other hardware simultaneously performs the upstream marking for face/span N+1. At the hardware boundaries between all of the various parallel hardware units, a double buffer technique also known as a ping/pong interface allows completely independent storage and retrieval of data that flows between the pipeline units.

For example the registers used to mark the octs needed for face/span N+1 may be written to, while the downstream fetch hardware is reading from an identical copy of registers previously written for face/span N. The pattern is always that the upstream hardware is writing to the ping component, while the downstream hardware is reading from the pong component. At an agreed upon signal, such as when both hardware units complete all processing, the ping/pong nature of the interface is switched such that upstream now writes to pong while downstream hardware reads from ping. Implementing double the storage needed at each interface, and using a ping/pong arrangement of control, allows each pipeline stage to operate independently of the other pipeline stages. The time taken to process face/spans then is determined by the pipeline stage which consumes the greatest amount of time prior to setting a signal that it is done processing. Providing adequate hardware resources to the worst case pipeline stage maximizes speed and avoids the creation of a weak link in the pipeline chain. In one embodiment, the ping/pong swap between hardware units is implemented at face/span boundaries.

Texture Stash Storage

In one embodiment, the texture stash is a ping/pong memory that allows storage of up to 32 octs of texels. This 16×16 square area of texels is said to float within the surface of four neighboring texture pages. Essentially an offset is determined by testing for the minimum S and T value of any touched oct within the area of four texture pages. This detected "minimum" oct location then defines, for example, the bottom left corner of this floating window of storage area. Given the size limitations of the area of octs touched by all samples within one face/span, then starting from this base minimum oct location, octs will not be demanded any more than 16×16 texels away from this corner. The texture stash therefore only need contain 16×16 texels, and the hardware maintains an offset value that is determined by the above described minimum detector.

As octs are fetched from graphics memory the minimum detected for the face/span is used along with the full address of the oct to determine the eight texel area in the texture stash where the incoming texels are to be placed. In this exemplary embodiment, one word read from graphics memory causes writing into eight texel locations in the texture stash memory.

In one embodiment of this invention, the texture stash is further organized into four independent banks, which can be read in parallel (with a very specific technique) which then supplies four texels at a time to the smoothing logic. This four texel parallel output capability provides a high throughput in the final smoothing pipeline stage.

The process of storing read texels into the texture stash accounts for this four texels in parallel memory arrangement. With eight texels arriving with a single read operation, the hardware takes two clock cycles to store the eight values, with four stored in parallel per clock cycle.

In one embodiment of this invention, the texture stash ping/pong memory comprises two identical sized banks. The texture stash thereby supports writing into the ping component, while reading from the pong component. In this ping/pong operation of the two banks, what was previously written is read during the next phase, and the previously read memory bank becomes the location used to store the next face/span of octs read from memory.

FIG. 1E illustrates the square shaped texture space unit which is use in accordance with one aspect of the present invention. The selection of the single level-of-detail for a span is based upon a conservative assumption of placing a square box 162 around the irregularly shaped projection of span corners 171–174 mapped into texture space. The span in image space may comprise a rectangular array of pixels. Typically when a span having varying depth levels is mapped into texture space it forms an irregularly shaped projection, as illustrated in FIG. 1E by polygon 170. Defining a bounded texture space area using square 162 simplifies the computations for the span because the texture space area can then be defined using just the coordinates of two diagonally opposing corners in contrast to defining all four of the corners of polygon 162. In texture space the T coordinate defines position along a vertical axis, and the S coordinate defines position along a horizontal axis.

After the surrounding square has been defined, the single texture level-of-detail for the span is selected for use by the entire span. The level-of-detail is selected so that the data required to generate the texture for the span can be stored within a predetermined amount of memory. Limiting the memory requirements of each span contributes to the efficiency of the texture generation process. In one embodiment, to facilitate efficient memory usage, memory contents for texture space are divided into texture pages. A texture page is a rectangular array of texels. FIG. 2 illustrates four 8×8 texture pages. The level-of-detail is then selected so that the texture data for the span is less than or equal to the amount of texture data that can be stored in one texture page. In terms of texture space, this means the size of the surrounding square is less then or equal to the size of one texture page. For example, if a level-of-detail 5 is initially selected, a 32×32 texel array is used. If at this level-of-detail the scan is mapped into texture space such that the surrounding square size is a 12×12 array of texels, then this indicates that too high a level-of-detail was used because the surrounding square is larger than the 8×8 texture page size. Here, level-of-detail 4 could be used to reduce the size of the surrounding square in half to 6×6 texels which then fits in a single 8×8 texture page.

Defining the surrounding square to be no larger than a texture page ensures that the surrounding square will be mapped onto no more than four texture pages. The placement and orientation of the polygon onto the texture pages depends upon the perspective of the "viewer" with respect to the objects. For example, in a flight simulator, the location and orientation of a pilot's "plane" in the flight simulation landscape determines the perspective of the viewer. A perspective may be such that the surrounding square aligns within a single texture page, as illustrated in FIG. 2. As the viewer moves in the simulated image space, the surrounding square may move along the S axis in texture space such that the surrounding square is comprised of parts of two texture pages, as illustrated in FIG. 3. Further movement by the viewer may then cause the surrounding square to shift along the T axis in texture space so that the surrounding square is comprised of components of four texture pages, as illustrated in FIG. 4. The relative position of the surrounding square determines the number of texture pages that must be accessed to generate the texture for the span inside the surrounding square. However, the size of the surrounding square remains no larger than one texture page, and a single level-of-detail is used to generate the texture for the span.

Overview of Texture Generation Process

Figure 6A:
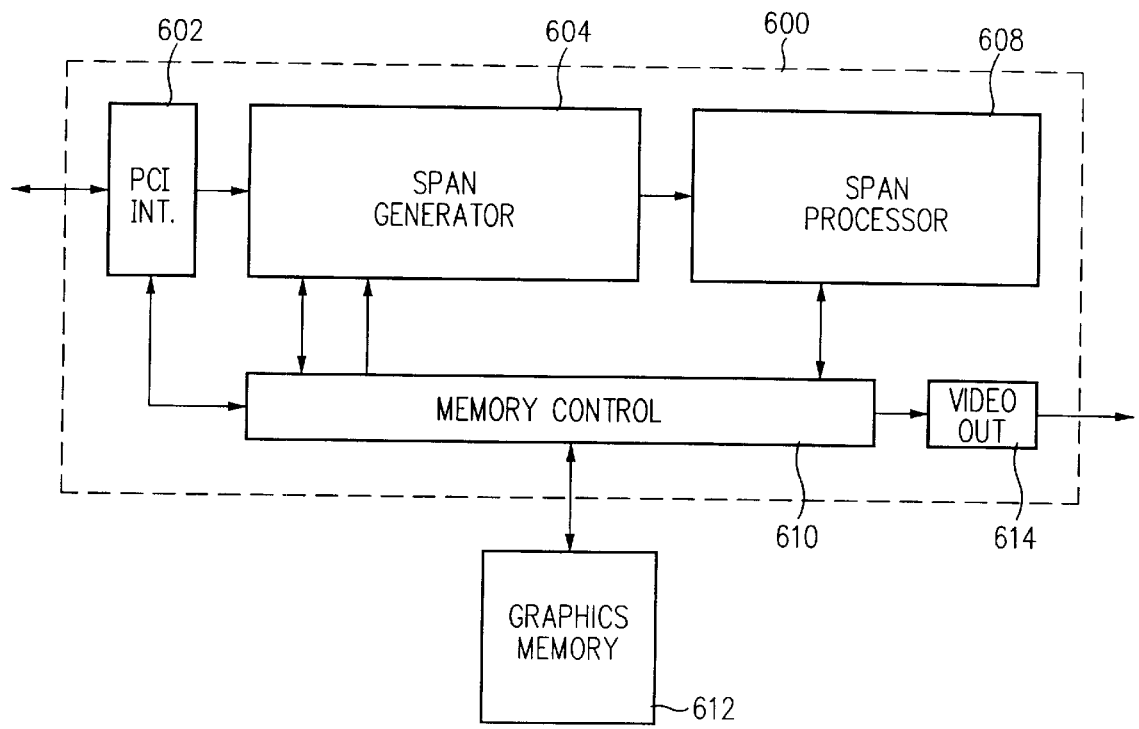
FIG. 6A illustrates a block diagram of a graphics processor system according to one embodiment of the present invention.

FIG. 6A illustrates a block diagram of a graphics processor system. Element 600 illustrates a three dimensional graphics processor chip according to one embodiment of the present invention. PCI Interface 602 provides an interface between the graphics processor and the PCI Bus of a computer system. Span Generator 604 divides the displayed image space into a grid of spans. In one embodiment the spans are defined to be 8×8 pixel arrays. Span Generator 604 specifies the priority of the spans. Span Processor 608 determines how the pixels in the span are displayed based on the image space rendering perspective and the models of three dimensional objects stored in texture space. Memory Control unit 610 controls access to off-chip Graphics Memory 612. Graphics Memory 612 stores the texture data used to render objects. Video Out 614 provides the output pixel rendering information.

Figure 6B:
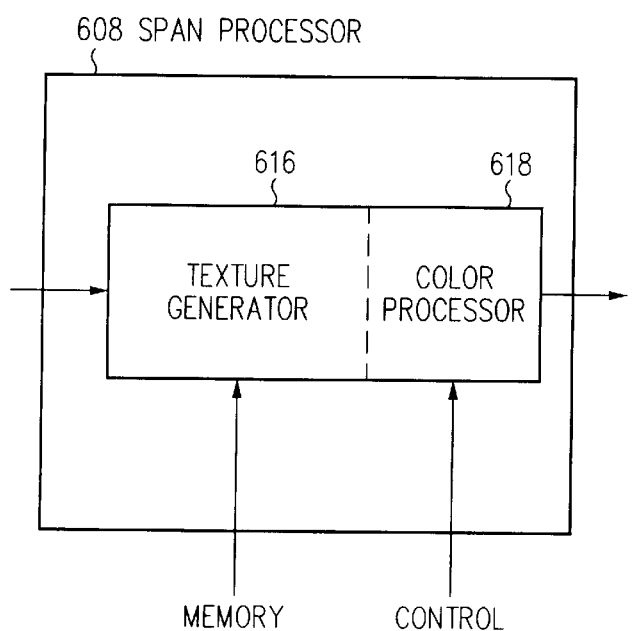
FIG. 6B illustrates a block diagram of Span Processor 608 according to one embodiment of the present invention.

FIG. 6B illustrates a block diagram of Span Processor 608 according to one embodiment of the present invention. Span Processor 608 is comprised in part of Texture Generator 616 and Color Processor 618. The input to Span Processor 608 is face-span data. Span Processor 608 uses this data to generate span color output information to a frame buffer. The operation of Span Processor 608 is described in more detail with respect FIG. 6C which provides an overview of the texture generation process.

Figure 5:
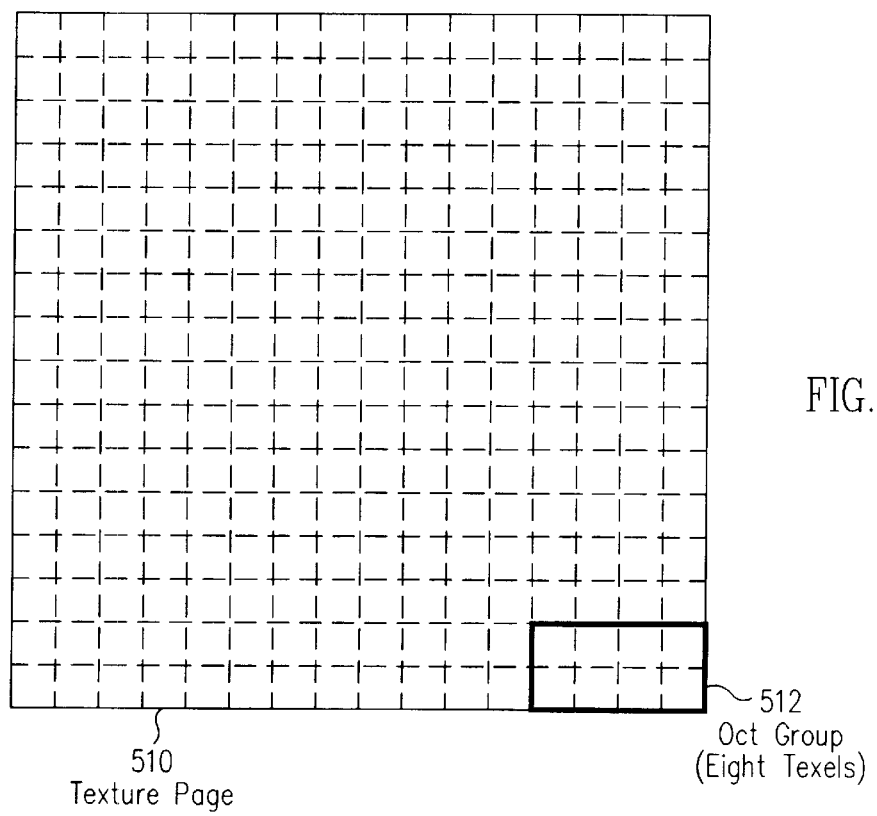
FIG. 5 illustrates an oct group 512 in a 16×16 texture page 510.

Texels are stored in graphics memory in 4×2 arrays of eight texels called oct groups, or just octs. Oct groups are memory subsections. FIG. 5 illustrates an oct group 512 in a 16×16 texture page 510. In one embodiment, a 64 bit wide memory is used as graphics memory, which allows each 64 bit word to contain information pertaining to eight texels, with eight bits per texel. In this embodiment, an oct group is the smallest addressable unit that can be fetched from graphics memory.

Each oct group may contain texels that are used to generate the texture for several pixels. If as in conventional texture generators the oct groups were loaded as the texture process for each pixel requests the oct groups then the same oct group may be loaded numerous times from memory to process a single span. This is inefficient. To avoid this inefficiency, in the present invention all of the oct groups that are used to generate texture for a span are identified before any of the oct groups for the span are loaded. This approach allows each oct group to be loaded only once for a span, and allows the oct groups to be read from memory sequentially to maximize efficiency. Thus for a texel that is used to generate texture for several pixels, rather than re-reading that texel from a main memory each time a new pixel is processed that uses the texel, in the present invention the texel is read once and stored in a texel cache to be available for all of the pixels in the current span.

Figure 6C:
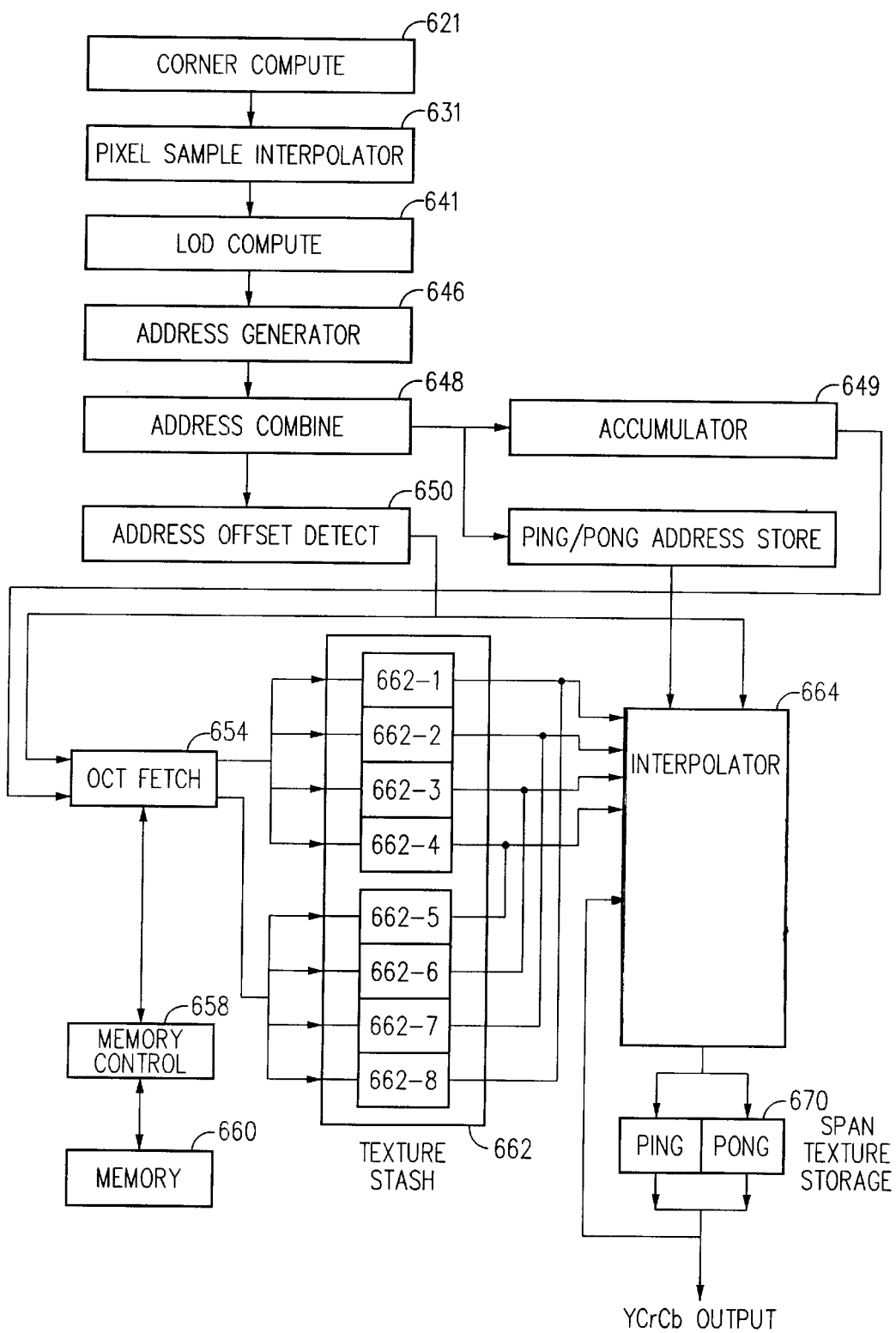
FIG. 6C illustrates a block diagram overview of the texture generation process according to one embodiment of the present invention.

FIG. 6C illustrates a block diagram overview of the texture generation process according to one embodiment of the present invention. To determine what texture is generated for a span, calculations are performed to select the appropriate texels in texture space to represent the objects in image space based on the image space perspective. At Corner Compute block 621 the image space span corners are mapped into texture space, as shown by corners 171–174 in FIG. 1E. In one embodiment, span corner depth values are used in the evaluation of the following texture equations per span corner:

$$S(I, J) = P1 + \frac{NI_0 + NI_i \cdot I + NI_j \cdot J}{D_0 D_i \cdot I + D_j \cdot J} \quad (1)$$

$$T(I, J) = P2 + \frac{N2_0 + N2_i \cdot I + N2_j \cdot J}{D_0 + D_i \cdot I + D_j \cdot J} \quad (2)$$

In both equations (1) and (2), the denominator term is the equation of reciprocal depth. These two equations are evaluated at each span corner. Once a numerator term is calculated at the top left span corner, this value can be updated to produce the numerator values needed at the three other span corners. In an embodiment where a span is 8 pixels by 8 pixels, to produce the top right span corner numerators, 8*Nj is added to the top left span corner numerators. This is be done for both N1 and N2. To produce the bottom left span corner numerators, 8*Ni is added to the top left span corner numerators. To produce the bottom right numerators span corner, 8*Ni+8 * Nj is added to the top left span corner numerators. Note that to calculate these bottom right numerators, the term used to produce the top right numerators is added with the term used to produce the bottom left numerators. The S and T results are used to produce the two texture indices needed to access two-dimensional texture.

At Pixel Sample Interpolator block 631 the locations of the remaining pixels in the span are mapped into texture space by interpolating from the span corners. In one embodiment, Pixel Sample Interpolator 631 determines the S coordinate value for a pixel using a bi-linear interpolation of the four span corner S values using the image space coordinates of the pixel. Similarly, Pixel Sample Interpolator 631 determines the T coordinate value for a pixel using a bi-linear interpolation of the four span corner T values using the image space coordinates of the pixel.

Level-of-Detail ("LOD") Compute block 641 selects the appropriate LOD to use for the span such that the texture data for the surrounding square in texture space can be stored in one texture page, as described above in regard to FIGS. 2–4. The LOD for a span is selected based on the gradient of the texture equation. The gradient of the texture equation gives a measure of the rate of change of the function with respect to a unit change in screen space. Two such rate of change measurements are made, and the larger value is used to arrive at a single texture LOD selection control number. The gradient is approximated by taking a difference between neighboring samples of the texture equation. The difference between values in both the I and J directions is determined. The square root of the sum of the squares then provides a good approximation of the gradient.

This selection process serves to avoid "under sampling." Under sampling, as defined by the Nyquist theory, occurs when sample points cause sampling of the original digitized data at less than two times the "frequency" of the original signal. In the graphics rendering context, the sample points are the gridwork of screen pixels, with the centers of the pixels defining the grid of sample points.

Observing this Nyquist limit during sampling implies that a texture LOD will be selected which guarantees that an 8×8 grid of sample points, a span, projects in texture space to an area no greater than an 8×8 shape rotated to the worst case angle. The worst case angle is a 45 degree rotation to the primary texture axis. Observing the Nicest limit thereby guarantees that a surrounding box aligned with the texture axis has dimensions no greater than:

$$\sqrt{2} \times 8 = 11.31$$

This value is rounded up to a square of dimension no greater than 12. This maximum projected size of the span in texture space using the selected LOD is one component that facilitates the method of the present invention.

Precise pixel sample points are provided as input. From these sample points, the texel addresses of the four surrounding texels is determined. The texture page and oct within the texture page are then determined based on these texel addresses. A base address specifies the starting location in graphics memory where texture information is stored. Each polygon includes a number which gives the offset from this base address which locates the first word of memory for the current MIP map. With the selected texture LOD, the texture page within the LOD, and the oct within the texture page as inputs, data can be mapped from source registers to the appropriate bit locations to get the address of the memory location to be read from. The level-of-detail is selected such that the texture data contained within the surrounding square is no larger than a texture page. Limiting the size of the texture data used to generate texture for a span ensures that the data can be stored in an on-chip texel cache used by the present invention to reduce memory access and increase texture generation efficiency.

The result of the LOD calculation is an LOD number, and an LOD blend coefficient. Detailed span processing includes calculating cell smoothing for one or two texture LODs, depending upon whether the LOD blend coefficient is zero or non-zero. The cell smoothing calculation is in one embodiment a bi-linear interpolation between the cells (texels) in the vicinity of the texture sample point. An LOD blend coefficient of zero means only one texture LOD must be calculated. A non-zero LOD blend coefficient means two texture LODs must be calculated and then "blended" together.

When two texture LODs are calculated, for example, LOD N and LOD N−1 the primary LOD number calculated is LOD N. When its needed the second LOD number is simply determined by subtracting 1 from N. Therefore computing LOD N involves significant computation, while computing N−1 is trivial. In one embodiment the computations for the first LOD and the second LOD are performed sequentially using a single hardware unit.

After the pixel interpolation process, Address Generator block 646 generates the addresses of the texels that will be needed to define the texture for each pixel in the span. In a bi-linear interpolation embodiment the four texels neighboring the pixel sample point in texture space are selected. For example, referring to FIG. 1A, for pixel sample point 110, the addresses for texels 111–114 would be generated for the texture generation process. Alternatively, a triangular interpolation method may be used. The LOD N texel address calculation first scales the pixel center S and T values by multiplying the number of texels of the LOD N map. For example, if LOD N is LOD 5, then the map at this level-of-detail is $2_5$ power number of texels in the S and T directions.

Address Combine block 648 uniquefies the addresses for all of the texels used to generate texture for the current span. Combine block 648 also compares the texture page that contains the current oct group with texture pages that contained the previous oct groups for the span so that oct groups can be processed according to the texture page they are in. Address Offset Detect block 650 keeps track of the address of the lower left corner texel that is used in a span so as to define the lower left corner of the texture page for that span stored in Texture Stash 662.

Accumulator 649 generates a list of the oct groups that each of the texel addresses generated by Address Generator 646 is contained in for the current span. Ping/Pong Address Store 652 stores the Texture Stash 662 address for each pixel in the span.

After Accumulator 649 has generated a list of all of the oct groups to be fetched to generate texture for the current span, Oct Fetch block 654 loads the oct groups. Identifying all of the oct groups that will be used before loading begins, enables Oct Fetch 654 to only fetch each oct group once. The oct groups are read from memory 660. In one embodiment memory 660 comprises a single bank of DRAM memory. Memory bank 660 may be comprised of, for example, EDO DRAM, SGRAM or SDRAM. The efficient memory access process of an embodiment of the present invention comprising identifying memory sections that will be used and reading those memory sections sequentially provides high performance texture generation using only this single bank of DRAM. Where memory 660 may be accessed by other computer components, Arbiter and Memory Control 658 provide the control mechanisms to avoid conflicts between the different components requesting memory access.

Oct Fetch 654 transfers the oct groups to Texture Stash 662. Texture Stash 662 comprises a ping/pong buffer and provides a double buffering function. Texture Stash 662 contains two sets of buffers, 662-1 through 662-4 and 662-5 through 662-8. Buffers 662-1 through 662-4 store the oct groups for a span as they are provided by Oct Fetch 654. Later all of the octs stored in buffers 662-1 through 662-4 are transferred to buffers 662-5 through 662-8. The octs stored in buffers 662-5 through 662-8 are used by interpolator 664. Thus providing the two sets of buffers in Texture Stash 662 increases the efficiency of the texture generation system by allowing Oct Fetch 654 to transfer octs for one span, while Interpolator 664 processes octs for a previous span.

Interpolator 664 performs the cell smoothing calculation. In one embodiment the cell smoothing calculation is a bi-linear interpolation between the cells (texels) in the vicinity of the sample point. For example, referring to FIG. 1A, the point 110, represents the point of texture sampling. The S and T values are the coordinates of this point. The grid of squares represent texels. In one embodiment, the location of point 110 relative to the dotted line box determines the control for a bi-linear interpolation between the corner vales. If the dot is located exactly at the top-left of the dotted line box, then the interpolation produces a value equal to the value of the top-left texel. Similarly if the dot is at the top-right of the dotted line box, then the interpolation gives the same value as the top-right texel. If the dot is exactly in the center of the dotted line box, then the interpolation produces a value which is the average of the four texel values.

The hardware completes the cell smoothing calculation for LOD N and LOD N−1 in sequence, first processing LOD N, and then optionally processing LOD N−1 with the same hardware. The first LOD results are stored in a per pixel memory (64 pixels). The second LOD, if it is processed for the current span causes the previous results in per-pixel memory to be updated. To accomplish blending between the two texture LODs, each pixel result is multiplied by an LOD multiply coefficient, and the product is either stored in memory, or added to the existing value in memory. The two blending multiply coefficients must add up to one.

In one embodiment a triangular cell smoothing method is used rather than bilinear. The triangular cell smoothing approach uses only three texels from a quad at a time to compute a smoothing result. This produces a continuous result. The bi-linear interpolation cell smoothing method may produce a higher quality image than triangular cell smoothing; however, triangular cell smoothing typically requires less hardware. The compromise in quality is only slight, since the primary purpose of cell smoothing is to create continuous results with no obvious discontinuities in value. A "second order" effect may be seen, which allows one to detect the triangular nature of the smoothing, but the overall visual effect is not objectionable. Whereas bi-linear cell smoothing uses a "quad" of texels, the triangular cell smoothing requires only a "triad" of three neighboring cells.

In one triangular interpolation method, for a pixel sample point in texture space three of four neighboring texels TL, TR, BL and BR are used. The 2×2 square of texels formed by TL, TR, BL and BR is divided into an upper triangle formed by texels TL, TR and BR, and a lower triangle formed by texels TL, BL and BR. If the pixel sample point is in the upper triangle then the interpolation value is determined using the equation:

$$\text{Value}=(1-\alpha)\ TL+\beta*BR+(\alpha-\beta)\ TR$$

where $\alpha$ defines the horizontal position of the pixel sample point relative to the texels, and $\beta$ defines the vertical position of the pixel sample point relative to the texels. If the pixel sample point is in the lower triangle then the interpolation value is determined using the equation:

$$\text{Value}=(1-\beta)\ TL+\alpha*BR+(\beta-\alpha)\ BL.$$

In one embodiment, these Smoothing Calculations are performed in hardware using Integer Multipliers and Adders. With the coefficients (1−b), a, and (b−a) going into the multipliers, consider that 1.0 can not be expressed—instead a number such as 255/256 is the largest possible value for an 8 bit input. Essentially the three terms must Add to 1.0, and when limited integers are used—all terms must instead Add to the same value (not 1.0). In one embodiment a lookup table is used to use limited precision a and b values, and look up the proper multiplier terms—which are limited precision integers (lookup tables containing integers tailored by a program to add to the same value), to allow for sums totaling 1.0.

In texture generation processes where calculations are performed for LOD N and LOD N−1, interpolator 664 blends the two results together to produce the final texture result of the Texture Generator. This process is called a tri-linear process, in reference to the two LOD calculations, and the third calculation blending the results.

The output of the Texture Generator is buffered using ping-pong Span Texture Storage buffer 670. The output of buffer 670 is coupled to a color processor. In operation, while one span is being computed, the output is written to the ping buffer by the Texture Generator, while the previously completed pong buffer is read by the color processor. This method produces texture color for each pixel in a single span. One embodiment uses a YCrCb format to represent the texture for each pixel. This end result is then stored in a color buffer.

Texel Cache Subsystem

Figure 7:
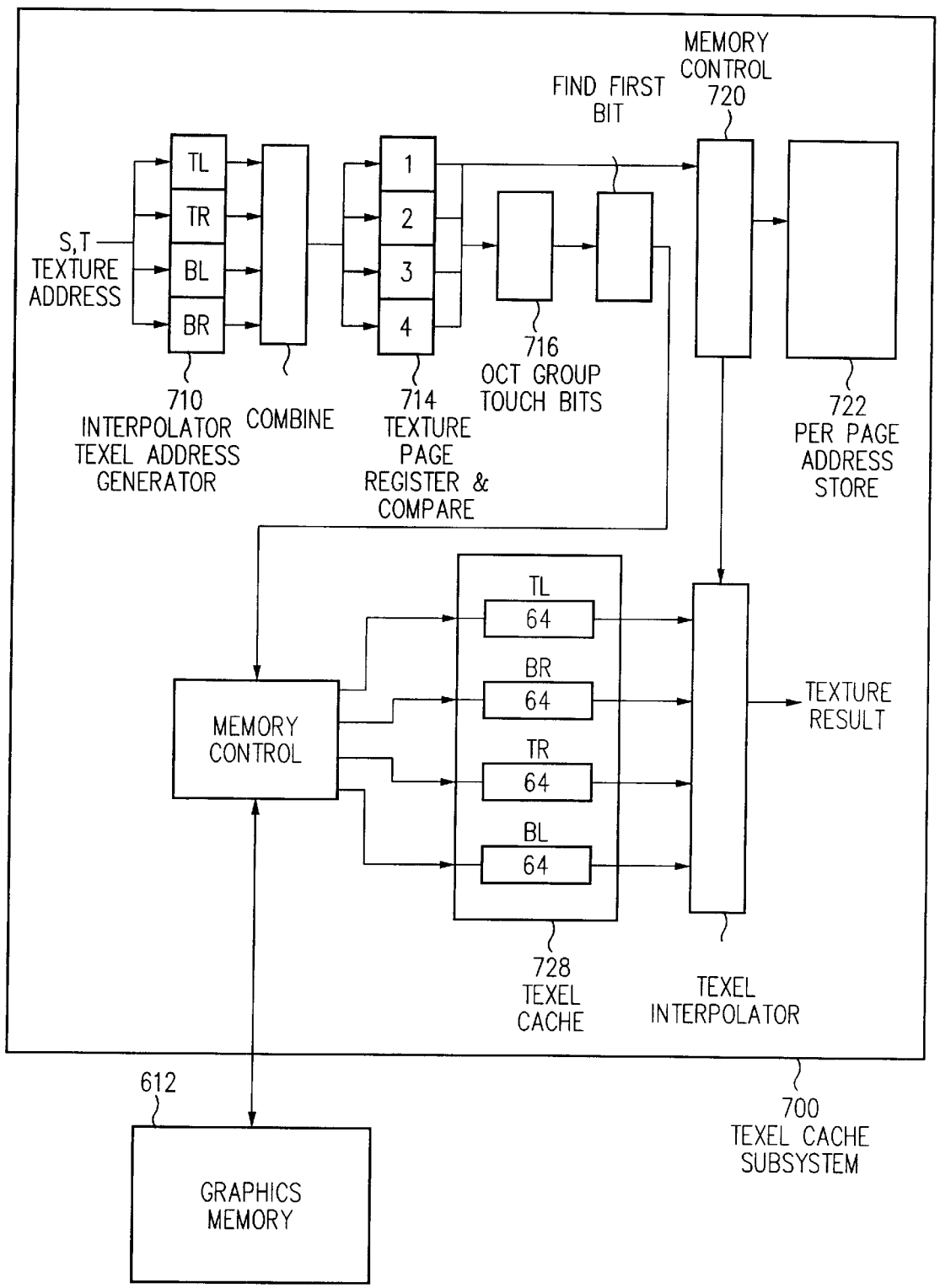
FIG. 7 illustrates a block diagram of the texel cache subsystem according to one embodiment of the present invention.

FIG. 7 illustrates a block diagram of the texel cache subsystem according to one embodiment of the present invention. The texel cache subsystem 700 is part of the texture generator component of Span Processor 608 illustrated in FIG. 6A. The graphics processor hardware of the present invention uses the reduced memory access requirements to enable the texture generator to gather all of the texture addresses for one span into Texel Cache 728 which is a small accumulator memory. The texture cache subsystem 700 takes as input the S and T values for a given texture level-of-detail, and it ultimately controls reading the octs from memory and using those values to compute cell smoothed results for one pixel. Texture cache subsystem 700 is a hardware embodiment for performing most of the texture generation process described with respect FIG. 6C.

In operation, in the texture generation process, after the per pixel sample address has been determined, and the adjacent texels identified, the addresses for each texel used in the texture generation process for the span is stored. Each texture address comprises an S and a T coordinate which define a specific point in texture space. The texture addresses are provided as input to the texel cache subsystem. Interpolator Texel Address Generator 710 takes this single sample point and produces the slightly offset addresses of the three or four neighboring texels needed to perform the first triangular or bi-linear interpolation. The following describes the process for a bi-linear interpolation embodiment. Interpolator Texel Address Generator 710 also determines the four texture page numbers and the four oct group numbers for the texels. The four texture page numbers are compared to determine the number of unique pages "touched" by the group of four texel addresses. For each unique texture page, the oct groups within the page area are all compared to determine the number of unique oct groups within the page. Each unique oct group within each unique page produces an output to Texture Page Register and Compare unit 714.

Each group of four texels used to compute cell smoothing or one LOD of one pixel can provide up to four unique inputs to Texture Page Register and Compare unit 714. Most of the time the group of four texels lie within the same texture page, so each group of four texels produces only one output. Often the group of four texels may lie within the same oct group. This causes only one oct group within the texture page to be marked as being required to be loaded from Graphics Memory 612.

In one embodiment where texture memory contents are organized into rectangular texture pages, an addressing scheme is used which allows direct location of a texture page using the high order bits of a texture address. The high order bits of the texture addresses are used with a special bit perturbation technique to directly specify the texture page of each sample texel. A simple binary operation on the bits produces the actual texture page number. An additional component of an addressing method of the present invention uses the low order bits of the texture address to directly provide the proper texel address within a texture page.

The four texels closest to the sample point can be in one to four unique texture pages. For example, in FIG. 1A, for sample 110, Interpolator Address Generator 710 would identify texels 111–114 as being the four closest texels to the sample point. As shown in FIG. 5, most 2×2 groups of texels fall within a single page, however where the sample point is on an edge of a texture page the four surrounding texels may be in two or four different texture pages. The Combine element 712 compares the texture page numbers for the selected texels and outputs the unique texture page numbers for the group of four addresses. Most of the time Combine unit 712 detects that all texture page numbers are the same, so only one output is provided to the Texture Page Register & Compare element 714.

The Texture Page Register & Compare 714 element includes four comparators that operate in parallel. The comparators are represented by the boxes within element 714 labeled 1, 2, 3 and 4. Texture Page Register & Compare 714 detects if the incoming texture page number matches any of the up to four unique texture page values encountered so far for the span. Matching one of the previously set texture page values indicates which of the four sections of Per Page Address Store memory 722 the incoming information should be stored in.

If the incoming texture page number does not match any of the existing numbers in comparators 1–4 of Texture Page Register & Compare 714, then the new value is added as the value to store in the next free comparator. The comparison process starts with the four comparators empty, and since there can be only four unique texture pages accessed for the current span, as demonstrated with FIGS. 2–4, the process of storing the current "non-matching" texture page number at most fills the four comparators during this process.

As these texture addresses are stored, a list of each oct group that contains one of these texels is generated. Oct groups that contain a texel that is used in the texture generation process are called touched oct groups. The oct group of texels touched by the current texture address is determined and set in the Oct Group Touch Bits 716 element. This unit maintains a set of four masks that keep track of the groups of texels in each of the up to four texture pages that are used to continue texture processing for the span. In an embodiment where a texture page is comprised of a 16×16 array of texels, a list of the touched oct groups is generated using 32 bit masks. Each of the 32 bit positions in the mask corresponds to one of the 32 oct groups in a texture page. As each new texture address is generated the oct group associated with each address is determined, and the bit associated with that oct group is enabled in the mask for that texture page. Multiple addresses may set the same oct group bit. The oct group bit storage implements a logical OR function, so any address within the oct group enables the oct group bit. Updating the oct group masks is a process of starting with all masks initially clear, and then setting one bit with each new input using a logical "OR" operation. The "OR" operation means that attempts to set the same bit multiple times leave the bit set to 1, so when the process is complete a record of all touched oct groups exists in the pattern of "ones" and "zeros" of each of the four mask words.

While the oct group touched bits are being updated, the low order bits of the input texture address are stored in Per Page Address Store memory 722. This memory is organized into four sections, with each section storing a list of these "low order bit" values. The selection as to which one of the four lists is to receive the current value is determined by the previous described process of detecting the unique texture page numbers which is performed by the Texture Page Register and Compare 714 component. One entry is saved for each pixel to be processed within the span. This storage allows all "oct touched" information to be gathered prior to reading from texture memory.

The processes described so far all constitute the "initial pass" of the texture generation process. This initial pass continues for all pixels of the span. In one embodiment of this invention an "upstream" process determines which pixels within the span are actually touched by the area of the polygon being rendered. A "pixel skip" capability can skip the detailed processing (especially texturing) for pixels which are outside the area of the current polygon. The graphics processor components will operate without modification in either case: 1) All pixels within the span can be processed without the sophistication of a pixel skip mechanism; or 2) Pixel skip can be assumed to be part of the upstream process, and the components described here do not require any sort of modification to accommodate the "missing pixels." The device described so far naturally accommodates skipping pixels, with the desired result that fewer texel read operations will be performed, on average, when the pixel skip capability is in use.

After all the pixels of the current span have been processed through the above described first pass of operation, the second pass of processing begins which includes sequentially reading from Graphics Memory 612 all oct groups needed to finish processing the span. Each oct group is read by Memory Control Unit 720 into the four component on-chip Texel Cache 728, illustrated in FIG. 7. Texel Cache 728 is specially designed to allow parallel access to four texel values at once, by storing groups of neighboring texels in separate memory sections. In the FIG. 7 embodiment a separate memory section in Texel Cache 728 is used for the top left texel, the bottom right texel, the top right texel, and the bottom left texel. Where these texels refer to the four texels closest to the sample point, as illustrated in FIG. 1A. In the second pass, the component labeled "find first bit" is used to detect each oct group touched bit in the mask of bits, outputting the next oct group to read, in sequence, until all bits that have been set have been detected and processed.

A special "offset" technique can be used to allow all touched oct groups for the four unique texture pages to be read into Texel Cache 728 before any of the entries are processed. This approach supports storing only one entry in Per Page Address Store 722 per output pixel. If this special offset technique is not used, then each texture page must be processed in turn, sequentially, and some pixel computations will be spread among different unique pages causing slightly more pixel calculations than pixels in a span, increased only when a triad spans texture pages.

This special technique requires a comparison of each oct group and texture page to determine the lower left corner of the total set of oct groups needed for a span (again, only one texture LOD at a time). When all oct groups have been marked as touched, as the oct groups are read from Graphics Memory 612, the lower left oct group address is subtracted from each oct group address as the texels are stored in Texel Cache 728. This acts to offset the Texel Cache to be a "roving window" of texels located somewhere within the four neighboring texture pages for the current span.

The texture LOD approach described above guarantees that all touched oct groups will lie within a "box" with dimensions no greater than 12 texels by 12 texels. This leads to oct groups being read in an area no greater than 4 octs wide by 8 octs high (since an oct is 4 texels wide by 2 texels high).

These two passes through the texture generation process are completely independent. In one embodiment of the invention the texture generation process described above operates on a span for one texture level-of-detail, and then following this the second texture level-of-detail is processed with the same hardware. The outputs are combined in the third pass.

After all oct groups of texels have been read into Texel Cache 728, the third and final pass of processing begins. To complete processing, the low order bits of the texture addresses are read out of Per Page Address Store 722. The low order bits of the texture addresses contain the per pixel sample texture addresses which are the S and T texture space coordinates corresponding to a pixel. The per pixel sample texture address provides a complete description of the pixel sample interpolation operations to be performed. The texture interpolation calculation is performed for each pixel address. In a bi-linear interpolation process the texture values of the four texels neighboring the per pixel sample address are combined to generate the pixel texture. In one embodiment, the fractional location of the per pixel sample relative to each of the four neighboring texels is also included, so that the texture combination is weighted based on the relative proximity of the sample point to each of the four texels. For example, where the S coordinate value of the per pixel sample address is 15.1 the textures of texels 15 and 16 are read, but the texture of the pixel is heavily weighted towards texel 15.

The output of this interpolate calculation goes to the portion of the hardware which combines the results of two passes through this same computation. The two passes perform two separate texture level-of-detail computations which are then combined in a final averaging (a one dimensional interpolation) step. This produces the final texture result from the texture generation process. The final texture result is used to affect the color or brightness of the current polygon at the proper pixel location in the accumulated output scene.

In one triangular interpolation embodiment, a Texel Cache with three interleaved memory sections, a Top-Left section, a Bottom-Right section and a Top-Right or Bottom-Left combined section is used. Each of these sections stores texels in the position identified by the memory section name. The section of Texel Cache 728 that stores the Top-Left texel of each triad contains 64 texels. The same is true for the Bottom-Right interleaved memory section. The Top-Right or Bottom-Left section contains 128 total texels.

The on-chip Texel Cache 728, with independent memory sections made out of high speed SRAM, feeds the texture interpolation calculation at the desired extreme high speed. In one triangular interpolation embodiment of the invention, this on-chip memory stores only 256 bytes, divided into one 128 byte RAM section (for Top Right/Bottom Left), and two 64 byte RAM sections (one for Top Left, and the other for Bottom Right). The memory control logic reads and processes each entry. The memory control logic produces a pixel of output (by processing one entry) in each clock cycle of operation. One major output per clock is a key performance issue with this type of device. The ultimate goal is achieving a steady pipeline operation which in the end produces one major result per clock. The various components are designed to achieve this ultimate goal.

The stages described above as first pass, second pass, and the third pass all operate in parallel via the use of "double buffering" of all key memory components. Those of ordinary skill in the art know of this high level pipelining concept. The output of the first pass is accumulated in a memory, as described above, while the previously stored results are processed through the second pass of processing. Similarly the transition from the second pass to the final (third) pass includes double buffering which supports the simultaneous storage and retrieval of data to and from the memories. This high level pipeline operation means that a span's worth of processing progresses through the hardware pipeline one stage at a time—but during these processes other spans are similarly fed into the pipeline in order to keep the pipeline full of data.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A method of generating texture for a computer graphics image comprising the steps of:
    identifying all texture data required to generate texture for an entire predetermined image space region;
    storing identifiers for said texture data required to generate texture for said entire predetermined image space region;
    accessing said texture data once for said predetermined image space;
    loading said texture data required to generate texture for said entire predetermined image space region after storing said identifiers for all required texture data so as to avoid duplicative loading of texture data for generating texture for said predetermined image space region; and
    interpolating using said loaded texture data to generate texture for pixels in said predetermined image space region.

2. A method of generating texture for a computer graphics image comprising the steps of:
    identifying all texture data required to generate texture for an entire predetermined image space region;
    storing identifiers for said texture data required to generate texture for said entire predetermined image space region;
    loading said texture data required to generate texture for said entire predetermined image space region after storing said identifiers for all required texture data so as to avoid duplicative loading of texture data for generating texture for said predetermined image space region;
    interpolating using said loaded texture data to generate texture for pixels in said predetermined image space region;
    mapping said predetermined image space region into texture space forming a polygon, wherein said predetermined image space region comprises a span;
    defining a square area in texture space surrounding said polygon; and
    selecting a first level-of detail for said entire span such that the amount of data used to generate texture for said entire span using said first level-of-detail is sufficiently small so that said data can be stored in a section of memory of a predetermined size.

3. The method of claims 1 or 2 wherein said mapping said predetermined image space region into texture space step further comprises the steps of:
    mapping corners of said predetermined image space region into texture space;
    interpolating using said predetermined image space region corners to generate per pixel sample point addresses for pixels in said predetermined space region.

4. The method of claim 3 wherein said step of interpolating using said loaded texture data to generate texture for pixels further comprises interpolating using texels adjacent to said sample point texture addresses to generate texture using said first level-of-detail for the entire span.

5. The method of claim 4 further comprising the steps of:
    selecting a second level-of-detail;
    interpolating using texels adjacent to said sample point texture addresses to generate texture using said second level-of-detail for the entire span;
    combining the results from the first level-of-detail computations and the second level-of-detail computations to generate texture for pixels in said span.

6. The method of claim 5 wherein computations for said first level-of-detail and computations for said second level-of-detail are performed sequentially by a single hardware unit.

7. The method of claim 6 wherein said step of identifying all texture data required to generate texture for an entire predetermined image space region further comprises the steps of:
    identifying a predetermined number of texels adjacent to a sample point texture address;
    identifying touched octs, wherein said touched octs comprise octs that said predetermined number of texels are contained in;
    storing a list of said touched octs by setting a bit in a mask corresponding to each of said touched octs.

8. The method of claim 7 wherein in said step of selecting a first level-of detail for said entire square area such that the amount of data used to generate texture for said entire span using said first level-of-detail is sufficiently small so that said data can be stored in a section of memory of a predetermined size, said predetermined size of said section of memory comprises a texture page so that at most four texture pages are managed in hardware to generate texture for a span.

9. The method of claim 8 wherein said step of storing identifiers for the texture data required to generate texture for an entire predetermined image space region further comprises the step of:
    storing a texture address, said texture address having high order bits which directly identify a texture page, said texture address further having low order bits which define a texel within a texture page defined by the high order bits.

10. The method of claim 8 wherein said step of interpolating using texels adjacent to said sample point texture addresses to generate texture using said first level-of-detail for the entire span further comprises performing a triangular interpolation.

11. The method of claim 10 wherein said method for generating texture skips over pixels that are outside the area of the current polygon.

* * * * *